US012190790B2

(12) United States Patent
Ozbas et al.

(10) Patent No.: US 12,190,790 B2
(45) Date of Patent: *Jan. 7, 2025

(54) DISPLAYS WITH CURRENT-CONTROLLED PIXEL CLUSTERS

(71) Applicant: X Display Company Technology Limited, Dublin (IE)

(72) Inventors: Murat Ozbas, Penfield, NY (US); Matthew Alexander Meitl, Durham, NC (US); Christopher Andrew Bower, Raleigh, NC (US); Lee B. Baker, Raleigh, NC (US); Robert R. Rotzoll, Colorado Springs, CO (US); Mike C. Chiu, Cary, NC (US); Ronald S. Cok, Rochester, NY (US)

(73) Assignee: X Display Company Technology Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,751

(22) Filed: Nov. 15, 2022

(65) Prior Publication Data

US 2023/0154390 A1 May 18, 2023

Related U.S. Application Data

(63) Continuation of application No. 17/388,823, filed on Jul. 29, 2021, now Pat. No. 11,568,796.

(51) Int. Cl.
*G09G 3/32* (2016.01)
*G09G 3/34* (2006.01)

(52) U.S. Cl.
CPC ............ *G09G 3/32* (2013.01); *G09G 3/3426* (2013.01); *G09G 2300/06* (2013.01); *G09G 2320/0686* (2013.01); *G09G 2330/021* (2013.01)

(58) Field of Classification Search
CPC .... G09G 3/32; G09G 3/3426; G09G 2300/06; G09G 2320/0686; G09G 2330/021
USPC ........................................................ 345/694
See application file for complete search history.

(56) References Cited

U.S. PATENT DOCUMENTS 5,550,066 A 8/1996 Tang et al.
7,622,367 B1 11/2009 Nuzzo et al.
8,506,867 B2 8/2013 Menard
8,722,458 B2 5/2014 Rogers et al.
9,520,537 B2 12/2016 Bower et al.
9,786,646 B2 10/2017 Cok et al.
(Continued)

*Primary Examiner* — Jason M Mandeville
(74) *Attorney, Agent, or Firm* — Choate, Hall & Stewart LLP; Michael D. Schmitt

(57) ABSTRACT

A current-selectable light-emitting-diode (LED) display includes pixels distributed in an array of rows and columns. The pixels are grouped in mutually exclusive clusters and cluster controllers are connected to each pixel in a cluster of pixels to control the pixels in the cluster to emit light. Each cluster controller comprises a selectable current source. Each of the selectable current sources can include cluster current sources that are responsive to a current-select signal to enable one or more of the cluster current sources. The pixels can include micro-LEDs and the cluster controller can be disposed between the micro-LEDs. The display can be disposed on a display substrate with signal wires. The signal wires can include separate wire segments that are electrically connected through regeneration circuits that regenerate the signals. The display can be an information display or a backlight.

23 Claims, 18 Drawing Sheets

(56) References Cited

U.S. PATENT DOCUMENTS

| | | | | |
|---|---|---|---|---|
| 9,799,261 | B2 | 10/2017 | Rotzoll | |
| 9,799,719 | B2 | 10/2017 | Cok | |
| 9,930,277 | B2 | 3/2018 | Cok | |
| 10,193,025 | B2 | 1/2019 | Bower et al. | |
| 10,223,962 | B2 | 3/2019 | Meitl et al. | |
| 10,262,567 | B2 | 4/2019 | Cok et al. | |
| 10,347,168 | B2 | 7/2019 | Meitl et al. | |
| 10,453,826 | B2 | 10/2019 | Raymond et al. | |
| 10,468,391 | B2 | 11/2019 | Cok | |
| 10,468,397 | B2 | 11/2019 | Cok | |
| 10,475,876 | B2 | 11/2019 | Bower et al. | |
| 10,910,355 | B2 | 2/2021 | Cok et al. | |
| 11,037,912 | B1 | 6/2021 | Meitl et al. | |
| 11,189,605 | B2 | 11/2021 | Bower et al. | |
| 11,568,796 | B1 * | 1/2023 | Ozbas | G09G 3/3426 |
| 2009/0230885 | A1 | 9/2009 | Tanaka | |
| 2010/0309100 | A1 | 12/2010 | Cok et al. | |
| 2011/0101870 | A1 * | 5/2011 | Cok | H05B 44/00<br>315/149 |
| 2016/0093600 | A1 | 3/2016 | Bower et al. | |
| 2017/0061867 | A1 | 3/2017 | Cok et al. | |
| 2017/0167703 | A1 | 6/2017 | Cok | |
| 2018/0182279 | A1 * | 6/2018 | Sakariya | G09G 3/2085 |
| 2018/0226386 | A1 | 8/2018 | Cok | |
| 2018/0247586 | A1 * | 8/2018 | Vahid Far | G09G 3/3216 |
| 2020/0051482 | A1 | 2/2020 | Cok et al. | |
| 2020/0302857 | A1 * | 9/2020 | Hsiao | G09G 3/32 |
| 2021/0375979 | A1 | 12/2021 | Cok et al. | |
| 2022/0028328 | A1 * | 1/2022 | Kim | H05B 45/397 |

* cited by examiner

DISPLAYS WITH CURRENT-CONTROLLED PIXEL CLUSTERS

FIELD OF THE DISCLOSURE

The present disclosure relates to flat-panel display architectures having matrix-controlled pixel clusters.

BACKGROUND OF THE DISCLOSURE

Flat-panel displays are widely used in conjunction with computing devices, in portable electronic devices, and for entertainment devices such as televisions. Such displays typically employ an array of pixels distributed over a display substrate to display images, graphics, or text. In a color display, each pixel includes light emitters that emit light of different colors, such as red, green, and blue. For example, liquid crystal displays (LCDs) employ liquid crystals to block or transmit light from a backlight behind the liquid crystals and organic light-emitting diode (OLED) displays rely on passing current through a layer of organic material that glows in response to the current. Displays using inorganic light-emitting diodes (LEDs) as pixel elements are also in widespread use for outdoor signage and have been demonstrated in a 55-inch television.

Displays are typically controlled with either a passive-matrix (PM) control scheme employing electronic control circuitry external to the pixel array or an active-matrix (AM) control scheme employing electronic control circuitry in each pixel on the display substrate associated with each light-emitting element. Both OLED displays and LCDs using passive-matrix control and active-matrix control are available. An example of such an AM OLED display device is disclosed in U.S. Pat. No. 5,550,066.

In a PM-controlled display, each pixel in a row is stimulated to emit light at the same time while the other rows do not emit light, and each row is sequentially activated at a high rate to provide the illusion that all of the rows simultaneously emit light. In contrast, in an AM-controlled display, data is concurrently provided to and stored in pixels in a row and the rows are sequentially activated to load the data in the activated row. Each pixel emits light corresponding to the stored data when pixels in other rows are activated to receive data so that all of the rows of pixels in the display emit light at the same time, except the row loading pixels. In such AM systems, the row activation rate can be much slower than in PM systems, for example divided by the number of rows. Active-matrix elements are not necessarily limited to displays and can be distributed over a substrate and employed in other applications requiring spatially distributed control.

Passive-matrix row and column control circuits are typically provided on the sides of and external to a display area (e.g., including the display light-emitting pixels) on a display substrate of a display and comprise packaged integrated circuits (ICs). Active-matrix circuits are commonly constructed with thin-film transistors (TFTs) in a semiconductor layer formed over the display substrate and employ a separate TFT circuit to control each light-emitting pixel in the display. The semiconductor layer is typically amorphous silicon or poly-crystalline silicon and is distributed over the entire flat-panel display substrate. The semiconductor layer is photolithographically processed to form electronic control elements, such as transistors and capacitors. Additional layers, for example insulating dielectric layers and conductive metal layers are provided, often by evaporation or sputtering, and photolithographically patterned to form electrical interconnections, or wires. In some implementations, small integrated circuits (ICs) with a separate IC substrate are disposed on a display substrate and control pixels in an AM display. The integrated circuits can be disposed on the display substrate using micro-transfer printing, for example as taught in U.S. Pat. No. 9,930,277.

Both active- and passive-matrix displays use electrical power to control the display and cause pixels to emit light. It is useful to reduce the power used by a display to reduce the operating costs of the display and, for portable displays powered by batteries, to increase the operating lifetime of the portable display between battery charges. There is an on-going need, therefore, for improved display efficiency.

SUMMARY

The present disclosure includes, among various embodiments, a current-selectable light-emitting-diode (LED) display comprising an array of pixels distributed in rows and columns. The pixels are grouped in mutually exclusive clusters. A cluster controller is connected to each pixel in a cluster of the mutually exclusive clusters to control the pixels in the cluster to emit light. Each of the cluster controllers comprises a selectable current source. Each of the selectable current sources comprises cluster current sources that are responsive to a current-select signal to enable one or more of the cluster current sources.

According to embodiments of the present disclosure, each of the cluster current sources in a cluster provides a different amount of current, each of the cluster current sources in the cluster provides a same amount of current, or some cluster current sources in the cluster provide the same amount of current and other cluster current sources in the cluster provide different amounts of current.

According to some embodiments, the cluster current sources are responsive to the current-select signal such that only one cluster current source is enabled by the current-select signal, such that no cluster current source is enabled by the current-select signal, or such that two or more cluster current sources whose current outputs are electrically connected in common are enabled by the current-select signal.

In some embodiments of the present disclosure, one or more of the cluster controllers are disposed between the pixels in the array. In some embodiments, each pixel comprises a pixel substrate comprising a fractured, broken, or separated pixel tether and each cluster controller comprises a cluster-controller substrate comprising a fractured, broken, or separated cluster-controller tether. A current-selectable LED display of the present disclosure can comprise a display substrate and the pixel substrate and the cluster-controller substrate can be each disposed directly on the display substrate. In some embodiments of the present disclosure, each of the clusters comprises a cluster substrate and the pixel substrates of the pixels and the cluster-controller substrate of the cluster controller in the cluster is disposed directly on the cluster substrate and the cluster substrate is disposed directly on the display substrate.

According to some embodiments, a current-selectable LED display of the present disclosure comprises a display substrate. For each of the clusters, each of the pixels in the cluster comprises a pixel substrate comprising a fractured, broken, or separated pixel tether, the cluster comprises a cluster substrate, the cluster controller is formed in or on and is native to the cluster substrate, the pixel substrates of the pixels in the cluster are disposed directly on the cluster substrate, and the cluster substrate is disposed directly on the display substrate. Each of the pixels can comprise a pixel substrate comprising a fractured, broken, or separated pixel tether disposed directly on the display substrate and the cluster controllers are formed in or on and are native to the display substrate.

According to some embodiments, for each of the clusters, each cluster controller in the cluster is operable to receive an image portion, receive a current-select signal corresponding to a luminance of the image portion, select a current of the selectable current source, and control the pixels in the cluster to emit light corresponding to the image portion. Each of the pixels can comprise LEDs and the cluster controller in each of the clusters can be operable to provide passive-matrix control to the LEDs in the cluster.

Each of the pixels can comprise one or more inorganic light-emitting diodes. Each of the light-emitting diodes can comprise a bare, unpackaged die comprising a separate, individual, and independent LED substrate. The LED substrate can have a (i) length no greater than 200 microns, (ii) a width no greater than 200 microns, (iii) a thickness no greater than 50 microns, or (iv) any combination of (i), (ii), and (iii). Each of the pixels can comprise a red LED operable to emit red light, a green LED operable to emit green light, and a blue LED operable to emit blue light.

According to some embodiments, the current-selectable LED display is a display for displaying images. According to some embodiments, the current-selectable LED display is a backlight and each pixel corresponds to a local-dimming zone of the backlight. The pixels and the cluster controllers can be comprised in a backlight and each of the pixels can correspond to a local-dimming zone of the backlight.

According to some embodiments of the present disclosure, a current-selectable LED display comprises a display row controller that provides row signals or a display column controller that provides column signals, or both. A first wire segment can be electrically connected to a first cluster in a row of clusters that conducts a signal between a cluster controller and the display row controller or a first wire segment can be electrically connected to a first cluster in a column of clusters that conducts a signal between a cluster controller and the display column controller, or both. A second wire segment can be electrically connected to a second cluster in the row of clusters or a second wire segment can be electrically connected to a second cluster in the column of clusters, or both. A signal regeneration circuit can be electrically connected to the first wire segment and electrically connected to the second wire segment that regenerates a signal conducted on the first wire segment and drives the regenerated signal onto the second wire segment.

According to some embodiments of the present disclosure, a current-selectable LED display comprises a display row controller that provides row signals. A first wire segment can be electrically connected to a first cluster in a row of clusters that conducts a signal between the display row controller and the first cluster. A second wire segment can be electrically connected to a second cluster in the row of clusters. A signal regeneration circuit can be electrically connected to the first wire segment and to the second wire segment that regenerates a signal conducted on the first wire segment and drives the regenerated signal onto the second wire segment.

According to some embodiments of the present disclosure, current-selectable LED display comprises a display column controller that provides column signals. A first wire segment can be electrically connected to a first cluster in a column of clusters that conducts a signal between the display column controller and the first cluster. A second wire segment can be electrically connected to a second cluster in the column of clusters. A signal regeneration circuit can be electrically connected to the first wire segment and to the second wire segment that regenerates a signal conducted on the first wire segment and drives the regenerated signal onto the second wire segment. The signal regeneration circuit can be micro-transfer printed onto a display substrate, the signal regeneration circuit can be micro-transfer printed onto a cluster substrate, the signal regeneration circuit can be native to a cluster substrate or a display substrate, or the signal regeneration circuit can be integrated into a common integrated circuit with the cluster controller.

According to some embodiments, integrated circuits (e.g., bare, unpackaged die) each comprise one of the cluster controllers. Each of at least a portion of the integrated circuits can comprise the one of the cluster controllers and a signal regeneration circuit.

According to some embodiments, the selectable current source comprises a programmable current reference that determines the current range of a cluster current source.

According to some embodiments, a current-selectable light-emitting-diode (LED) backlight for a display comprises pixels distributed in an array of rows and columns, wherein the pixels are grouped in mutually exclusive clusters; and cluster controllers. Each cluster controller is connected to each pixel in a cluster of the mutually exclusive clusters to control the pixels in the cluster to emit light. Each of the cluster controllers can include a selectable current source.

According to some embodiments, a method of forming a current-selectable light-emitting-diode (LED) display, the method comprising: providing (i) pixels each comprising light emitters (e.g., non-native light emitters) on a pixel source wafer, (ii) a cluster source wafer comprising cluster substrates, and (iii) a display substrate. Mutually exclusive clusters can be formed to include a cluster controller and ones of the pixels. The cluster controller can include a selectable current source and can be operable to control the ones of the pixels to emit light with the selectable current source. Forming the mutually exclusive clusters can include printing the pixels from the pixel source wafer to the cluster substrates of the cluster source wafer. Subsequently, the mutually exclusive clusters can be printed from the cluster source wafer to the display substrate. In some embodiments, the mutually exclusive clusters are comprised in a backlight.

Embodiments of the present disclosure provide display control methods, designs, structures, and devices that reduce the power used by a display.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
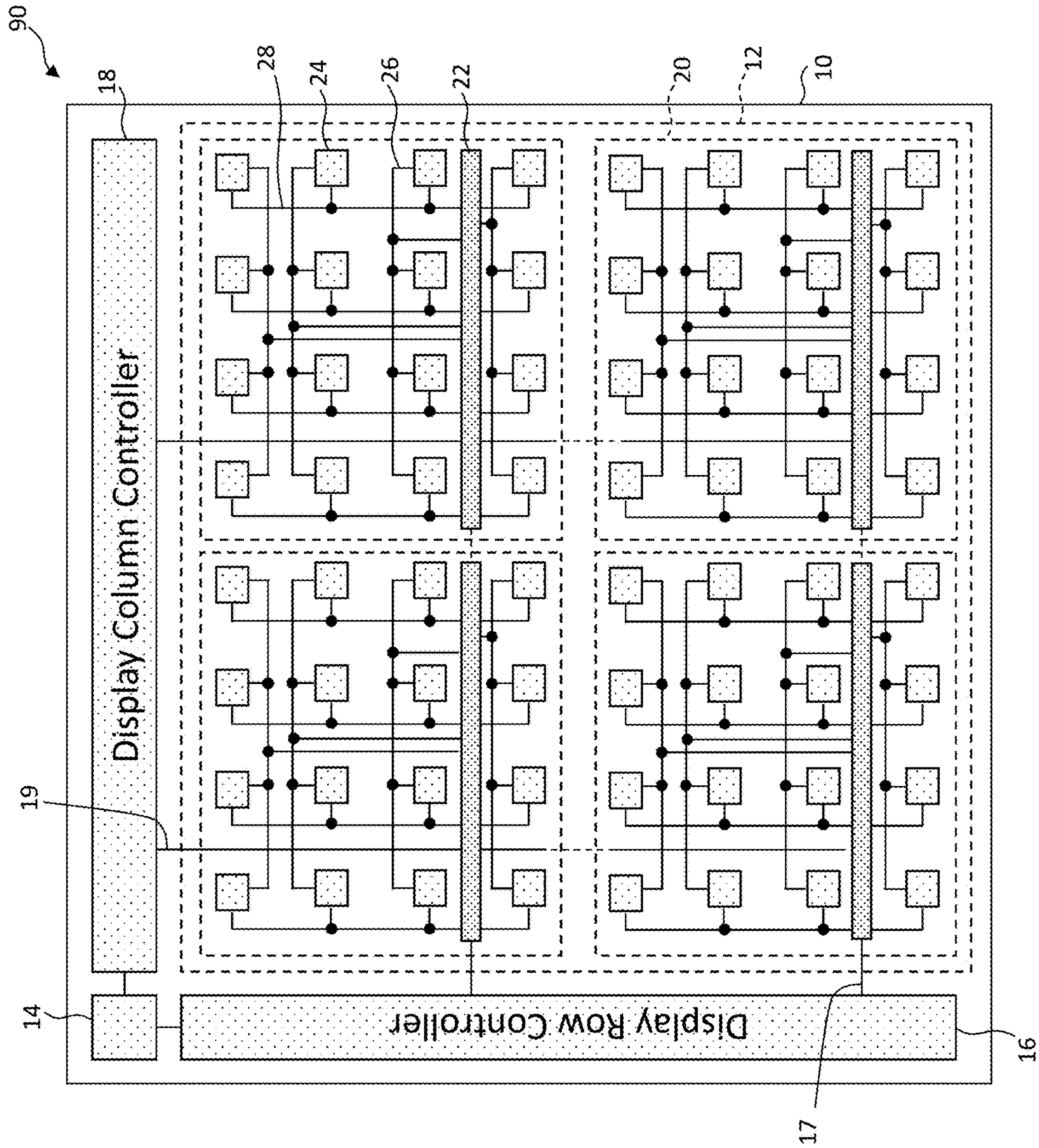
FIG. 1 is a schematic plan view of a display comprising pixel clusters according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

DETAILED DESCRIPTION OF CERTAIN EMBODIMENTS

Embodiments of the present disclosure provide light-emitting information displays and backlights that require less power. As used herein, the generic term 'display' refers to both an information display that shows information, such as an image, text, or video, to a viewer, such as a micro-LED display, and to a local-area-dimming backlight that provides structured illumination to a light-valve display, such as a liquid crystal display (LCD). Each pixel of a backlight can variably illuminate multiple pixels in an LCD thereby providing local-area dimming. For conciseness, the word 'display' is used in the following. Unless otherwise clear from context, where a 'display' is described, analogous embodiments of a backlight, with or without corresponding light control feature(s), such as an LCD layer, present, are also contemplated.

According to some embodiments of the present disclosure and as illustrated in FIGS. 1, 2A, 2B, and 2C, a current-selectable light-emitting diode (LED) display system 90 comprises display pixels 24 distributed in an array of rows and columns. Pixels 24 are grouped in mutually exclusive pixel clusters 20 so that no pixel 24 is in more than one cluster 20 and every pixel 24 is in a cluster 20. A cluster controller 22 controls pixels 24 in each cluster 20 and each cluster controller 22 is connected to each pixel 24 in cluster 20 of pixels 24 so that pixels 24 emit light responsive to cluster row signals 26 and cluster column signals 28. Each cluster controller 22 comprises a selectable current source 30. A selectable current source 30 is responsive to a current-select signal 40 (discussed below with respect to FIGS. 4A-4C) to select a current range provided to pixels 24 to emit light. The current range limits the maximum amount of current that can be supplied to pixels 24 and therefore limits the maximum brightness (luminance) of pixels 24. Thus, selecting a different current range using current-select signal 40 can alter brightness characteristics of pixels 24.

Cluster controllers 22 can receive control signals, for example display row signals 17 (e.g., row-select or timing signals) from a display row controller 16 and display column signals 19 (e.g., column-data, current-select signals 40, or timing signals) from a display column controller 18. Display row and column controllers 16, 18 can receive display signals (e.g., display control signals) from a display controller 14 or can themselves constitute a display controller 14. Display controller 14 can receive image data (image pixels) from an external source. Display row signals 17 and display column signals 19 can include data signals, row or column select signals, and timing signals, for example providing active-matrix control to pixel clusters 20 by providing image pixel data for each display pixel 24 from display column controller 18 through display column wires 19 to each cluster 20 in a row of clusters 20 selected by display row controller 16 through display row wires 17. For illustrative clarity, display row signals 17 and display row wires 17 are designated with the same identifier since display row signals 17 are carried on display row wires 17 and are not easily distinguished in the drawings. Similarly, display column signals 19 and display column wires 19 are designated with the same identifier since display column signals 19 are carried on display column wires 19 and are not easily distinguished in the drawings.

Clusters 20 and pixels 24 can be disposed on a display substrate 10, for example a glass or polymer substrate, within a display area 12 comprising all of pixels 24 and at least some of cluster controllers 22. Display area 12 can be, for example, a convex hull of pixels 24. Thus, in some embodiments, at least a portion of cluster controllers 22 are disposed between pixels 24 on display substrate 10. In contrast, display row controller 16, display column controller 18, and display controller 14 can be disposed on display substrate 10 external to display area 12, for example adjacent to the edges or sides of display area 12. Display row controller 16, display column controller 18, and display controller 14 can be packaged integrated circuits mounted on display substrate 10. According to some embodiments, display row controller 16, display column controller 18, and display controller 14 can each be one or more unpackaged bare die, for example disposed on display substrate 10 by micro-transfer printing, or a thin-film transistor circuit disposed on display substrate 10.

Figure 2A:
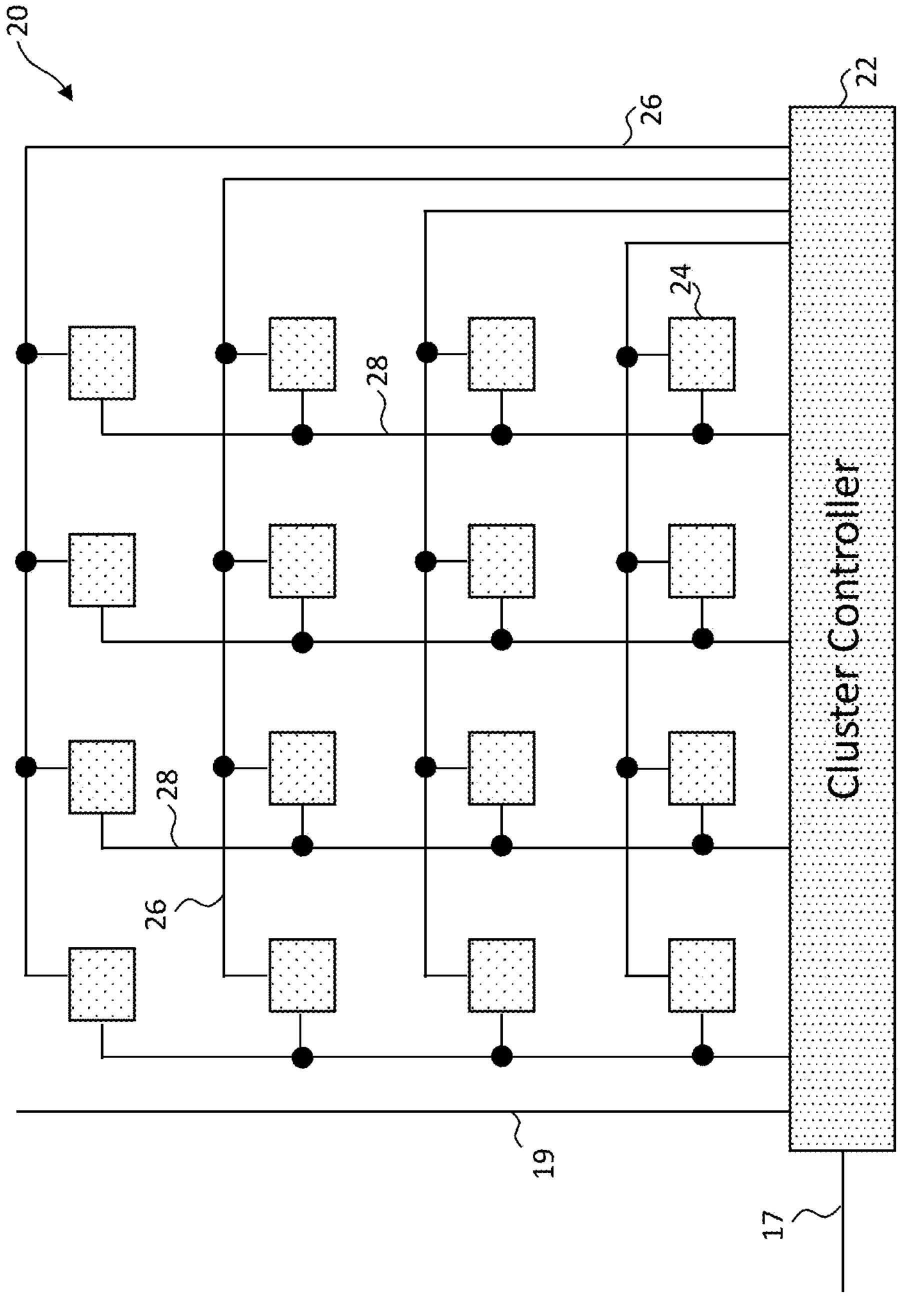
FIGS. 2A-2C are schematic plan views of a pixel cluster according to illustrative embodiments of the present disclosure.
Figure 2B:
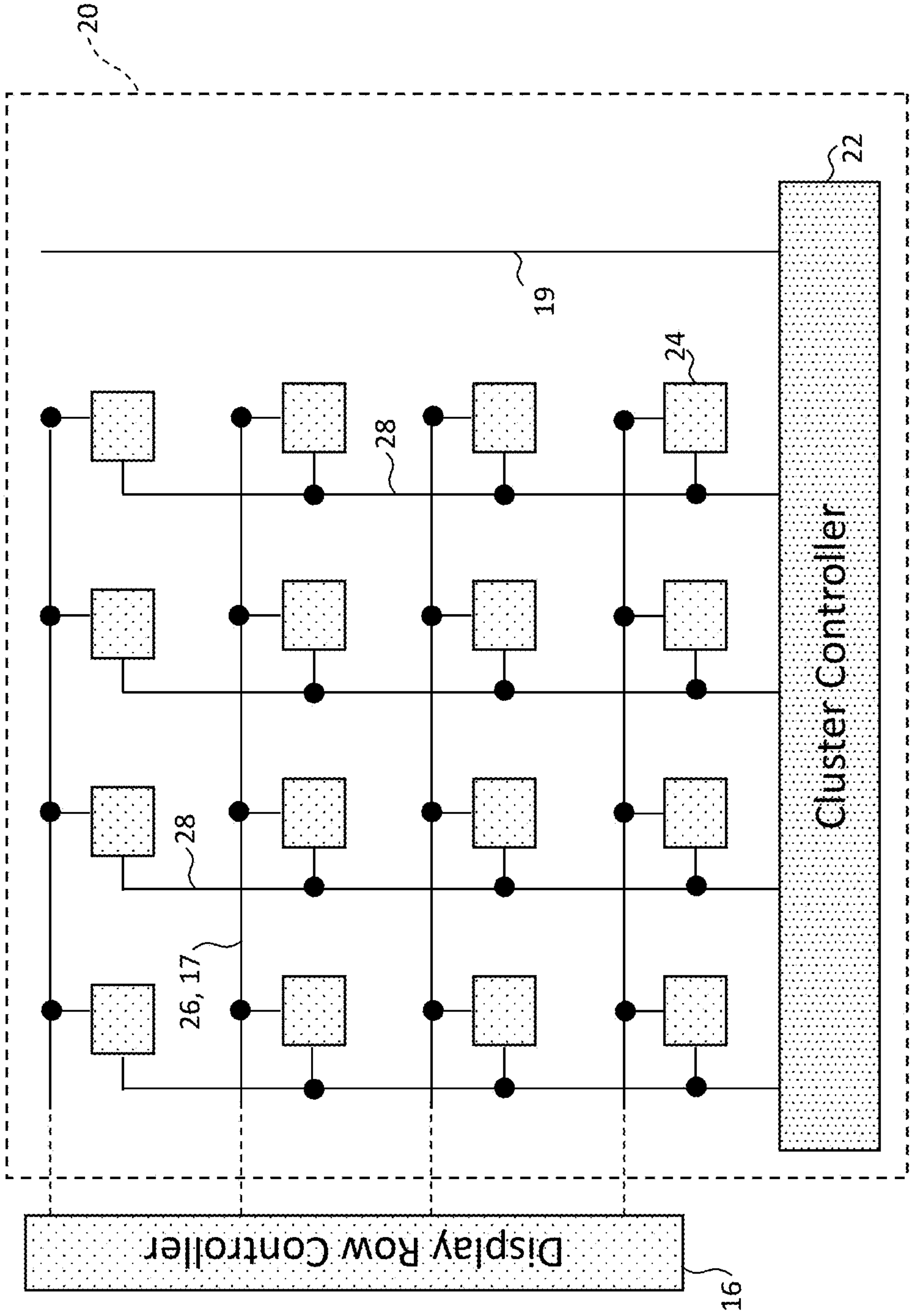

As shown in FIG. 2A, a cluster controller 22 of a cluster 20 can receive display row signals 17 and display column signals 19 from display row controller 16 and display column controller 18, respectively. Cluster controller 22 can be directly connected to each pixel 24 in cluster 20 and can provide both cluster row signals 26 and cluster column signals 28 to provide either active- or passive-matrix control of pixels 24. As shown in FIG. 2B, pixels 24 in a cluster 20 can receive display row signals 17 and display column signals 19 from display row controller 16 and cluster controller 22 can receive display column signals 19 from display column controller 18. According to the illustrations herein, a wire (e.g., display row wires 17 and display column wires 19) incorporating dashes indicates that additional clusters not shown in the Figure can be connected to the wire e.g., as shown in FIGS. 1, 2B, and 3, and FIGS. 9A-9B discussed below. As shown in more detail in FIGS. 3A, 3B, according to some embodiments, display row signals 17 from display row controller 16 can also serve as anode control lines for LEDs 60.

Figure 2C:
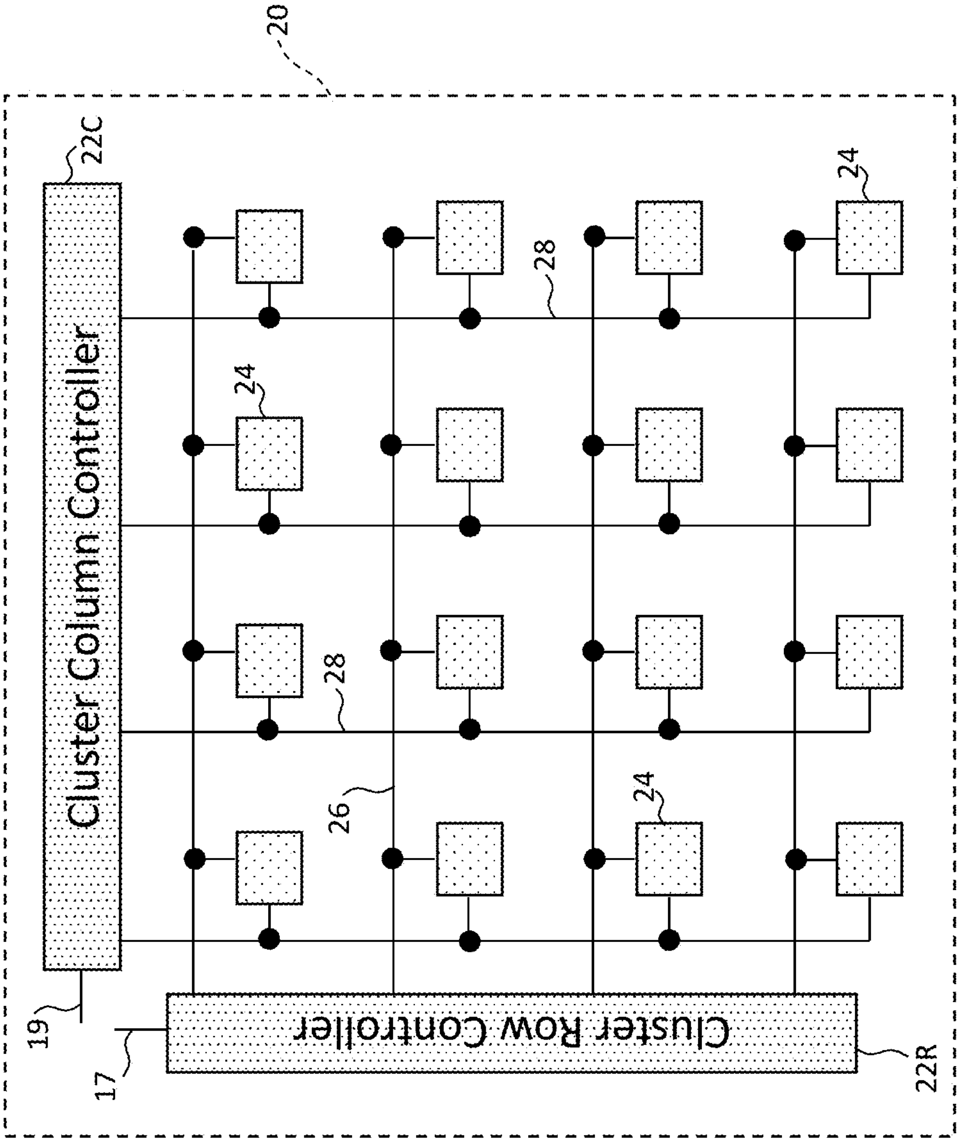

According to some embodiments of the present disclosure and as illustrated in FIG. 2C, cluster controller 22 can comprise multiple integrated circuits, for example unpackaged, micro-transfer printed, bare die disposed at least partly or completely between pixels 24 providing a cluster row controller 22R and a cluster column controller 22C to enable passive- or active-matrix control of pixels 24.

Figure 3A:
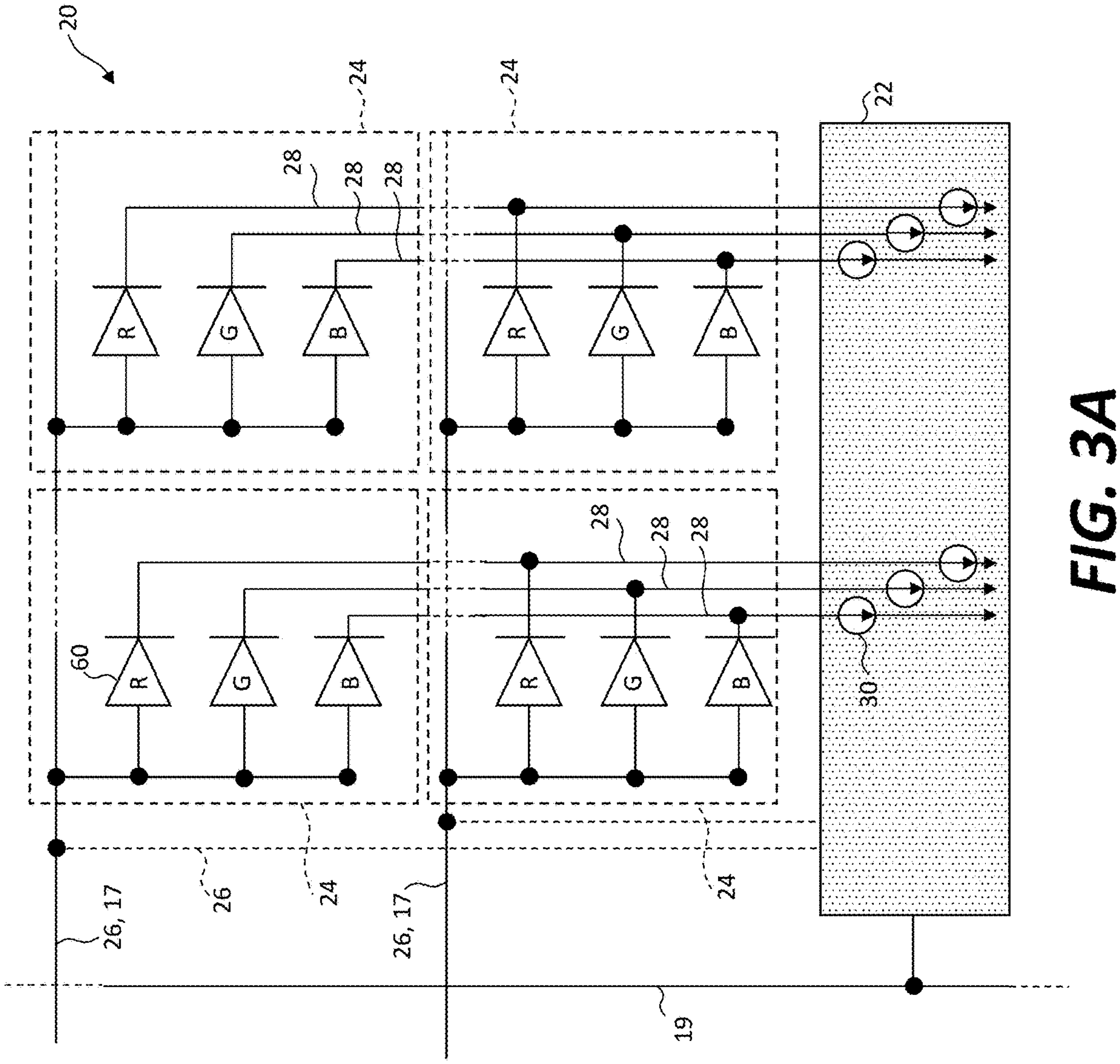
FIGS. 3A and 3B are schematics of pixels in a cluster according to illustrative embodiments of the present disclosure.
Figure 3B:
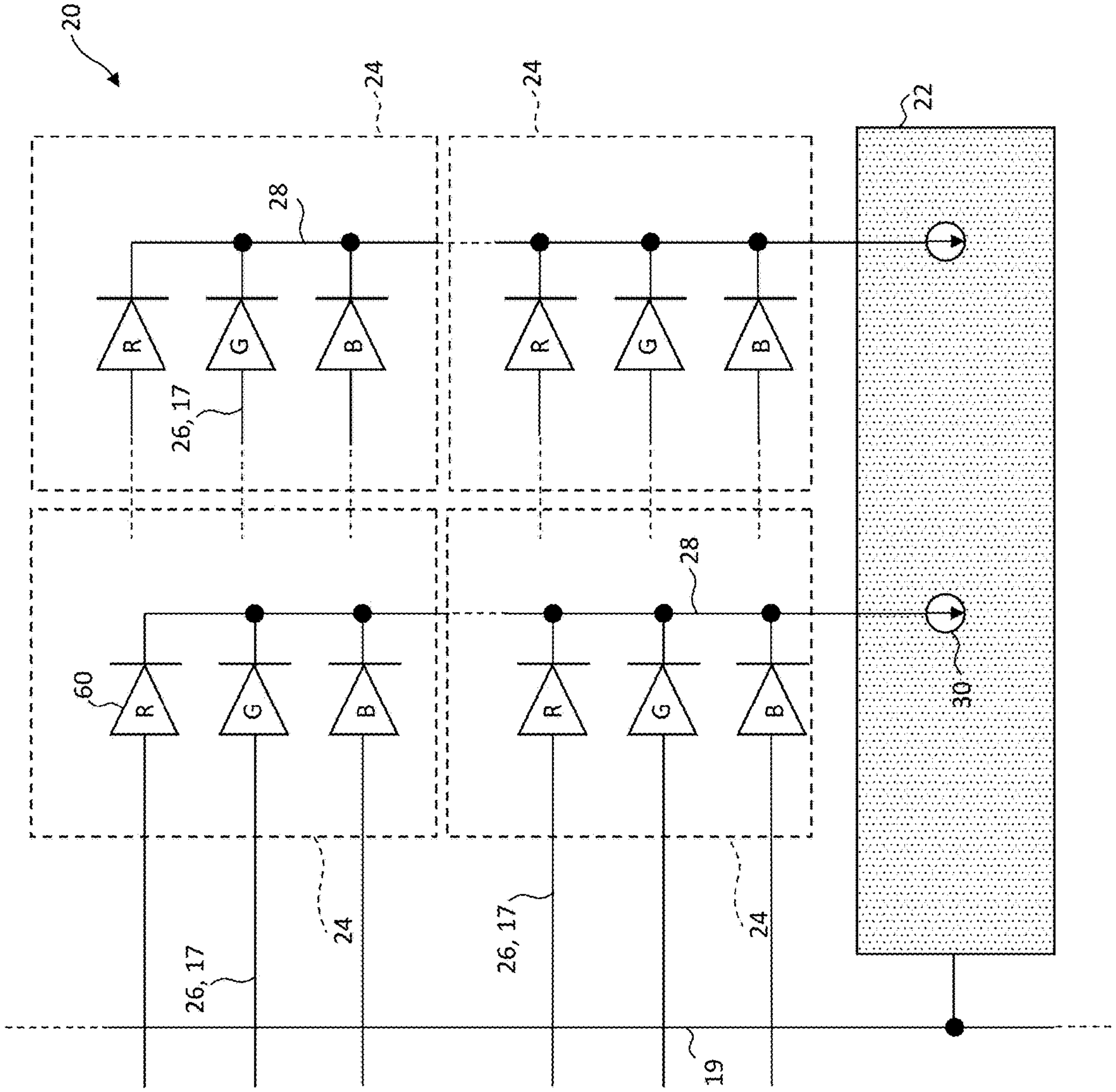

According to embodiments of the present disclosure and as illustrated in FIGS. 3A and 3B, pixels 24 of clusters 20 can comprise one or more light emitters 60, for example micro-light-emitting diodes 60 that each emit different colors of light, for example red LEDs that emit red light, green LEDs that emit green light, and blue LEDs that emit blue light when provided with enough current at a suitable voltage. Display row signals 17 (e.g., display row-select signals) or cluster row signals 26 (e.g., cluster row-select signals) and cluster column signals 28 (e.g., cluster column-data signals) can provide enough current at suitable voltages to drive each of LEDs 60 in each pixel 24. Display or cluster row signals 16, 26 and display column or cluster column signals 18, 28 can comprise one or more of row-select, timing, column-data signals, or current-select signals 40 but are not limited to such and can implement any suitable control and data function desired.

As shown in FIG. 3A, a separate selectable current source 30 is provided for each color of LEDs 60 and a common voltage provided either by cluster controller 20 or externally, for example by display row controller 16. As shown in FIG. 3B, a common selectable current source 30 is provided for all colors of LEDs 60 and different voltages provided for each color of LEDs can be provided either by cluster controller 20 or externally, for example by display row controller 16. In some embodiments, both a common voltage and selectable current source 30 are provided to all of the different colors of LEDs 60. In some embodiments, the colors of LEDs 60 are controlled in a color sequential fashion and a single selectable current source 30 is provided to all of the different colors of LEDs 60 in cluster 20. By providing different voltages or selectable current sources to different colors of LEDs 60, the realized efficiency of LEDs 60 can be improved, since different colors of LEDs 60 can have different efficiencies at different voltages and currents. Furthermore, a voltage provided to LEDs 60 (for example from display row controller 16 or cluster controller 20) can be different from an operating voltage provided to cluster controller 20. Since LEDs 60 and cluster controller 20 can comprise different semiconductor material (e.g., a compound semiconductor and silicon, respectively) that operate efficiently at different voltages, for example cluster controller 22 can operate at a lower voltage than LEDs 60, providing different voltages can improve overall realized efficiency.

Pixels 24 can comprise light emitters 60, for example light-emitting diodes 60, for example inorganic light-emitting diodes 60, for example micro-light emitting diodes 60 having a length or width no greater than one hundred microns, for example no greater than fifty microns, no greater than twenty microns, no greater than fifteen microns, no greater than twelve microns, or no greater than ten microns, and, optionally, a thickness no greater than fifty microns, for example no greater than twenty microns, no greater than ten microns, or no greater than five microns. As discussed further below, micro-light-emitting diodes 60 can be bare, unpackaged die, for example integrated circuit die, and can be micro-transfer printed from a micro-light-emitting diode source wafer to display substrate 10 and can comprise a broken (e.g., fractured) or separated LED tether 61 as a consequence of micro-transfer printing. Cluster controllers 22 can likewise be unpackaged bare die, for example integrated circuit die, and can be micro-transfer printed from a cluster controller source wafer to display substrate 10 and comprise a broken (e.g., fractured) or separated controller tether 23 as a consequence of micro-transfer printing. Cluster controllers 22 can have a length or width no greater than two hundred microns, for example no greater than one hundred microns, no greater than fifty microns or no greater than twenty microns, and, optionally, a thickness no greater than fifty microns, for example no greater than twenty microns, no greater than ten microns, or no greater than five microns. Micro-transfer printed integrated circuits, for example micro-LEDs 60, are relatively small and can therefore be provided at a high density and resolution on display substrate 10. Likewise, cluster controllers 22 can be very small and can therefore be provided between pixels 24 in display area 12 on or over display substrate 10.

Each cluster controller 22 can comprise a single selectable current source 30 so that all of pixels 24 and LEDs 60 in each cluster 20 are driven with a single selected cluster current source 36. In some embodiments, each cluster controller 22 can comprise a selectable current source 30 for each color of LED 60 (e.g., three selectable current sources 30, one for each of the red-light emitting, green-light emitting, and blue-light emitting LEDs in a cluster 20. In some embodiments a selectable current source 30 can be provided for each row or column of pixels 60 or for each color of LED 60 in each row or column of pixels in cluster 20. In some embodiments, separate selectable current sources 30 can share some components but are nonetheless capable of providing different current ranges. For example, cluster current sources 36 can comprise a current reference and different current references can be provided for and shared by each color of LEDs 60. Furthermore, the range of a cluster current source 36 can be specified by the input current reference. Different cluster current source 36 ranges can be provided by a programmable current source. Thus, current-select signal 40 can program a programmable current source, thereby selecting a cluster current source 36 range. As used herein, selecting a range of a cluster current source 36 is the same as selecting a cluster current source 36.

Figure 4A:
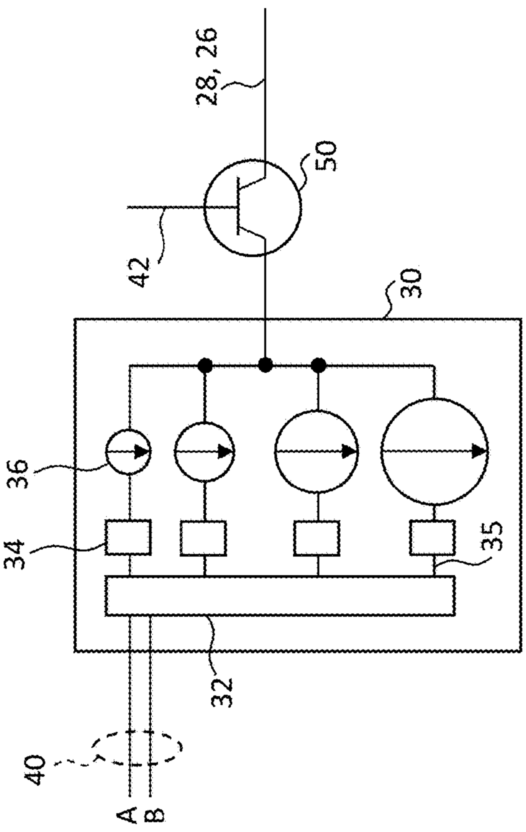
FIGS. 4A-4C are schematics of selectable current sources and a timing switch according to illustrative embodiments of the present disclosure.
Figure 4B:
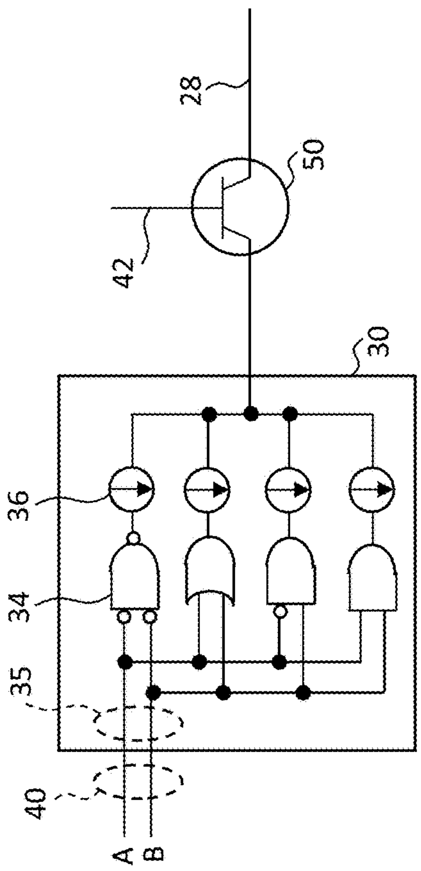
Figure 4C:
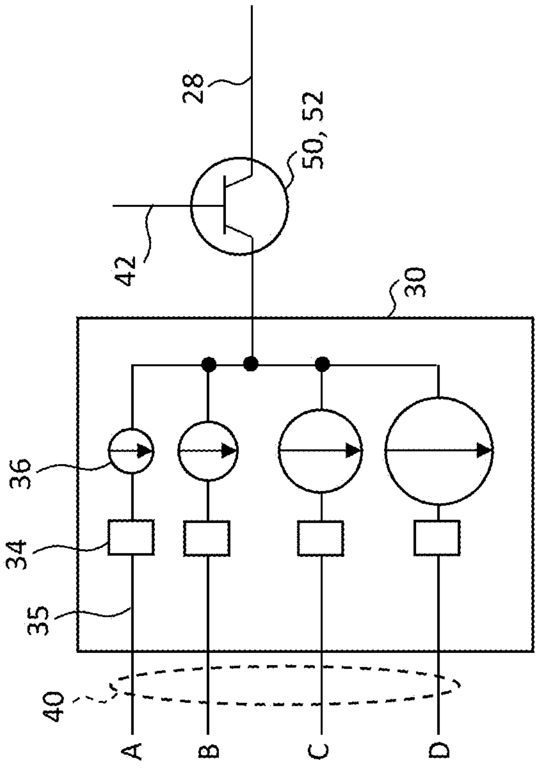

A selectable current source 30 is a circuit that provides electrical current in two or more ranges that are selected by a current-select signal 40. Current-select signal 40 can be a digital value presented on one or more wires to the selectable current source 30 circuit or current-select signal 40 can be an analog value. For example, FIGS. 4A-4C illustrate selectable current sources 30 according to embodiments of the present disclosure and Table 1 is a table illustrating example current ranges associated with each of four different current-select signals 40 presented as a two-bit binary value to selectable current source 30. The ranges and circuits illustrated in FIGS. 4A-4C and Table 1 are exemplary and not limiting. Those knowledgeable in the digital and analog electronic arts will appreciate that there are many ways to implement selectable current source 30 and many possible current ranges that are useful in a display system 90, such as a backlight.

As shown in Table 1, four different luminance values corresponding to the four different possible two-bit binary values selected by current-select signal 40 are each associated with one of four different current ranges: 0 to 1 μA, 0 to 4 μA, 0 to 16 μA, and 0 to 64 μA. These ranges are selected as suitable for micro-LEDs, but other ranges are possible and are included in the present disclosure. Moreover, the logarithmic progression of the different selectable current ranges is exemplary; some embodiments can comprise other progressions, for example linear or a power series. According to some embodiments of the present disclosure, one of current-select signals 40 can indicate no cluster current source 36 is selected so that all of the cluster current sources 36 are disabled or effectively turned off.

TABLE 1

| | | |
|---|---|---|
| 00 | Luminance level 0 | 0 to 1 μA |
| 01 | Luminance level 1 | 0 to 4 μA |
| 10 | Luminance level 2 | 0 to 16 μA |
| 11 | Luminance level 3 | 0 to 64 μA |

In some embodiments and as shown in FIG. 4A, selectable current source 30 comprises four different cluster current sources 36 of different ranges with outputs connected in parallel and with a high-impedance output so that any one of cluster current sources 36 can be active at time, for example each providing a current range as illustrated in Table 1 and represented by current-source symbols of different sizes. A larger current-source symbol represents a cluster current source 36 that can provide current over a relatively larger range (not necessarily to scale). A demultiplexer 32 converts the binary current-select signal 40 into enable circuit control signals 35 that each enable a single different cluster current source 36 with respective enable circuit 34.

In some embodiments and as shown in FIG. 4B, selectable current source 30 comprises four cluster current sources 36 each having the same range (as illustrated with current-source symbols of the same size) connected in parallel. Enable circuits 34 enable one, two, three, or four of cluster current sources 36 in response to current-select signal 40, thus providing 0 to 1 μA, 0 to 2 μA, 0 to 3 μA, or 0 to 4 μA (if each cluster current source 36 provides 0 to 1 μA while other ranges can be achieved with other cluster current sources 36). In some embodiments, the same-range cluster current sources 36 of FIG. 4B could be replaced by the different-range cluster current sources 36 of FIG. 4A, providing different combinations of different current ranges, e.g., 0 to 5 μA (ranges 1 and 2 combined) or 0 to 21 μA (ranges 1, 2, and 3 combined).

In some embodiments and as shown in FIG. 4C, in some embodiments selectable current source 30 can comprise multiple cluster current sources 36 and any one or combination of cluster current sources 36 can be active at the same time and can be connected in parallel so that the total cluster current sources 36 by selectable current source 30 is the sum of all of the activated cluster current sources 36. The cluster current sources 36 can have the same range (e.g., as in FIG. 4B) or have different ranges (e.g., as in FIGS. 4A and 4C).

Figure 5:
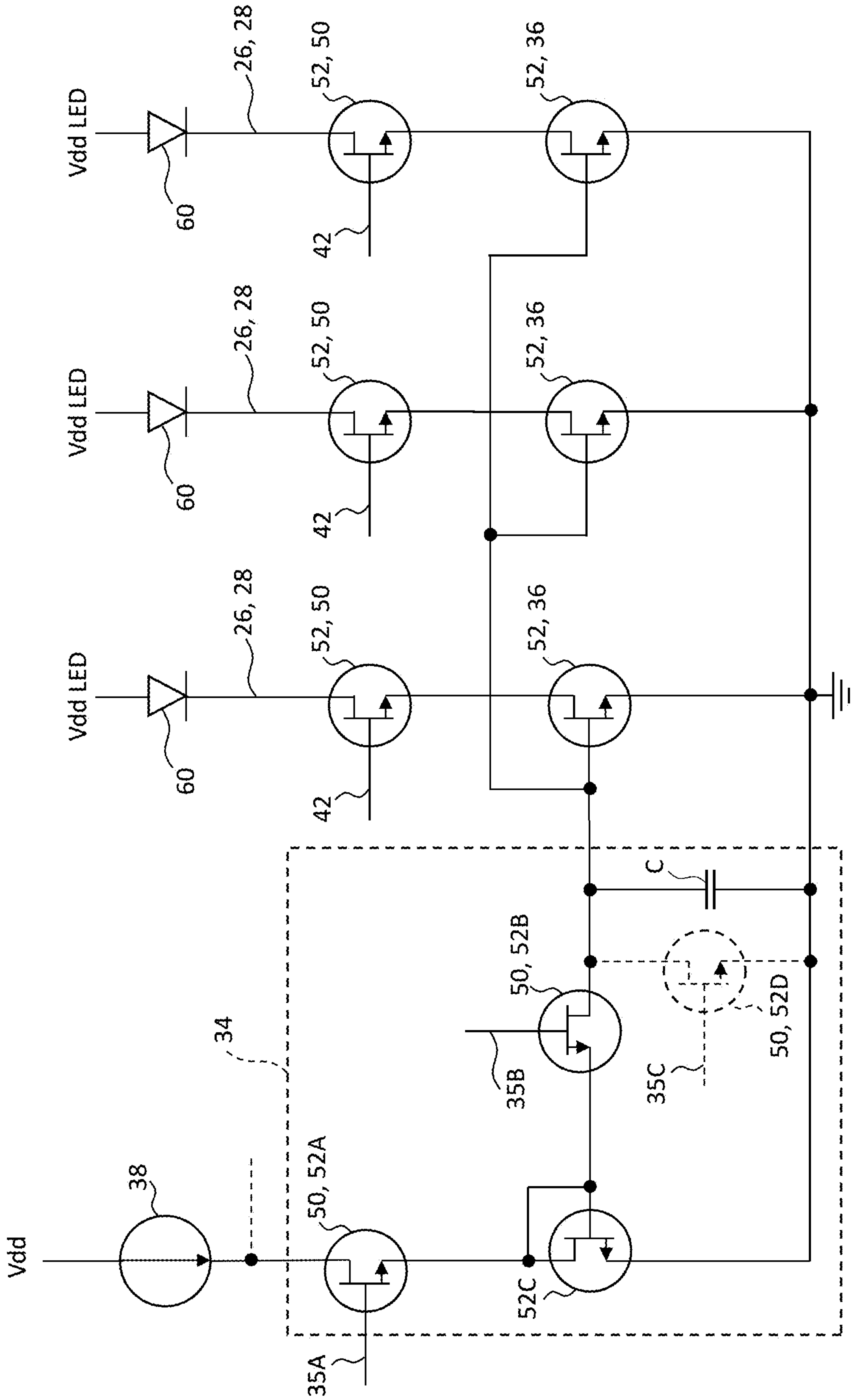
FIG. 5 is a schematic of a current source and enable circuit according to illustrative embodiments of the present disclosure.

Embodiments of the present disclosure can operate with any of a variety of cluster current sources 36. FIG. 5 illustrates a generic cluster current source 36 that is enabled with enable circuit 34, for example comprising two control transistors 52A, 52B responsive to enable circuit control signals 35A and 35B (collectively enable circuit control signal 35), respectively and a transistor 52C with a connected source and drain driving a capacitor C to form a sample and hold circuit that controls the gate of current source 36 (a transistor 52). When the gate voltage control signal on current source 36 transistor 52 is low, leakage through capacitor C and the cluster current source 36 transistor 52 is reduced, saving power. In some embodiments, an optional control transistor 52D responsive to enable circuit control signal 35C can short capacitor C and ensure that the gate of current source 36 transistor 52 is grounded to further reduce leakage in capacitor C and current sources 36. When the gate voltage is high current can flow through cluster current source 36. The range of currents provided by cluster current source 36 can depend on the size of transistor 52 in cluster current source 36 (a larger transistor 52 can provide a greater current range) or current reference 38. As shown in FIG. 5, the gate control signal is connected to multiple cluster current sources 36 in parallel so that the multiple cluster current sources 36 are enabled in common. In some embodiments, enable circuit 34 drives only a single cluster current source 36. According to some embodiments, current reference 38 can be part of enable circuit 34 or can be shared among multiple enable circuits 34 (as shown with the dotted line connection to the output of current reference 38) in order to save circuitry. In some embodiments, one or more current reference 38 can be disposed in a display row controller 16 and connected to one or more cluster controller 22, saving circuitry in cluster controller 22.

Once cluster current source 36 is enabled, the provided current can be turned on or off with a switch 50 (for example comprising one or more transistors 52) in response to a timing signal 42 and the current provided to a cluster row signal 26 or cluster column signal 28 to turn LEDs 60 on or off. According to some embodiments of the present disclosure, cluster controller 22 is a passive-matrix controller for pixels 24 in cluster 20 and timing signal 42 is a pulse-width modulation or pulse-density modulation signal that uses temporal modulation to control the luminance of pixels 24 at a constant current.

According to embodiments of the present disclosure, LEDs 60 emit light most efficiently at a particular current. This efficient current can be different for different LEDs, for example LEDs made with different materials or that emit different colors of light (e.g., due to having different compositions of a binary or ternary compound semiconductor). It is useful, therefore, to operate LEDs 60 at their most efficient current to provide a power-efficient display and to select different efficient currents for different corresponding types of LEDs 60. Passive-matrix control can provide higher currents for shorter periods of time that, in some embodiments, match currents needed for efficient LED 60 operation.

LED 60 in pixel 24 can emit different amounts of light in response to a control signal (e.g., timing signal 42) and the number of light levels (the luminance) is determined by the range of the control signal. However, if pixel 24 only operates within a subset of the range, the number of realized luminance levels is decreased. For example, if pixel 24 only operates at relatively low luminance levels, the higher luminance levels are never activated, and the reduced number of different luminance levels can lead to perceptible contouring (pixelization) in an image pixel. Thus, contouring is reduced if the actual luminance range of a display pixel 24 is matched to the desired luminance of a desired image pixel. Furthermore, transistors 52 (and some other components, such as capacitors) in cluster current sources 36 can leak current and the larger the transistor 52 (or other components) the more current can leak. Leakage can be reduced by reducing the voltage provided to a gate of a transistor or across a capacitor, for example by reducing the voltage output by enable circuit 34. Although the leakage of a single transistor 52 can be relatively small, if the leakage occurs for every pixel 24 in a high-resolution display, the power wasted can be considerable, especially for portable display applications in which power efficiency is an important consideration. Thus, leakage is reduced if cluster current source 36 for an LED 60 provides only the current required for a desired LED luminance range. If additional current is provided but not used in a cluster current source 36, additional current leakage also occurs, reducing efficiency.

Therefore, according to embodiments of the present disclosure, a current-selectable light-emitting-diode display comprises pixels 24 arranged and controlled in clusters 20. Each cluster 20 has a selected range of electrical current necessary to operate pixels 24 in cluster 20. The desired range can be determined by analyzing image pixel values input to cluster 20, for example a portion of an image corresponding to cluster 20, to determine the brightest image pixel in cluster 20 and selecting the smallest luminance range of selectable current source 30 that can provide the desired luminance in cluster 20 according to the brightest image pixel. By selecting the smallest luminance range, power leakage is reduced in selectable current source 30 and the number of luminance levels in each cluster 20 is maintained, improving power efficiency, and reducing image contouring. Use of a larger number of clusters 20 within display 90 of a given size can also enable further reductions in image contouring and improvements in efficiency (e.g., more clusters 20 decreases cluster size for a given resolution, thereby allowing for improved matching of luminance ranges to current sources 36).

Figure 6:
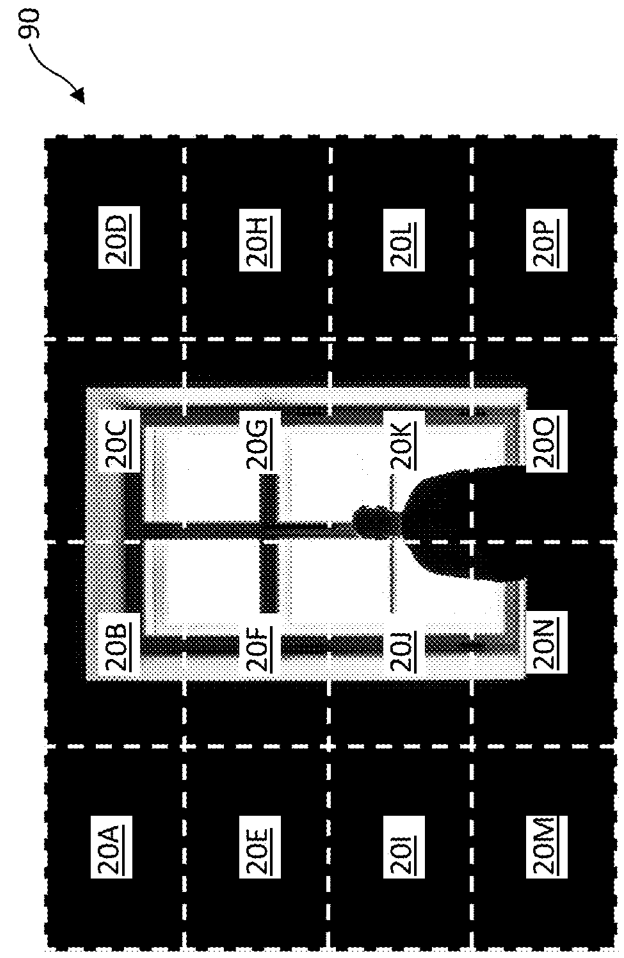
FIG. 6 is a diagram of a display with clusters displaying an image with clusters having different luminances according to illustrative embodiments of the present disclosure.

For example, and with reference to a simplified small example illustrated in FIG. 6, an image can be divided into a four-by-four array of sixteen clusters 20, labeled 20A-20P. (In practice, for example, a 2k display might have 8192 clusters 20 each having 256 pixels 24.) Clusters 20A, 20D, 20E, 20H, 20I, 20L, 20M, and 20P (dark clusters 20) include only pixels 24 that are relatively dark and clusters 20B, 20C, 20F, 20G, 20J, 20K, 20N, and 20O (bright clusters 20) include a range of pixels 24 that are both dark and light. Current for dark clusters 20 can be provided with a relatively small current range (e.g., 0 to 1 μA) and bright cluster 20 can be provided with a relatively large current range (e.g., 0 to 64 μA). Dark clusters 20 will therefore have reduced current leakage and current-selectable light-emitting-diode display system 90 will have increased power efficiency. Furthermore, pixels 24 in dark clusters 20 can have reduced contouring because the reduced luminance range (because of the reduced current range of dark clusters 20) has the same number of luminance levels as clusters 20 with a greater luminance range. Since the human visual system has increased sensitivity to different luminance levels primarily in darker areas, embodiments of the present disclosure can provide displays with reduced visible contouring in darker areas without reducing luminance for a given image bit depth, and with reduced power usage and increased power efficiency. In effect, current-selectable light-emitting-diode display system 90 having clusters 20 provided with different current ranges can be a high-dynamic range (HDR) display.

For example, given an image with an eight-bit image pixel depth (256 luminance levels) and a two-bit current range corresponding to Table 1, the number of luminance levels at luminance level 0 is 256 and the number of additional luminance levels at each of luminance levels 1, 2, and 3 is 192 (because the lower luminance values in the larger current ranges are redundant with those of the lower current ranges) for a total of 832 luminance levels available (but only 256 are available in any one cluster 20). Thus, in this example, an approximately four-fold increase in available luminance levels across display 90 is realized as compared to an equivalent display without selectable current sources 30 or clusters 20. This example specifies eight bits, but as will be appreciated by those knowledgeable in the display arts, any number of bits greater than one can be used in a design according to embodiments of the present disclosure, for example ten bits or twelve bits.

Figure 7A:
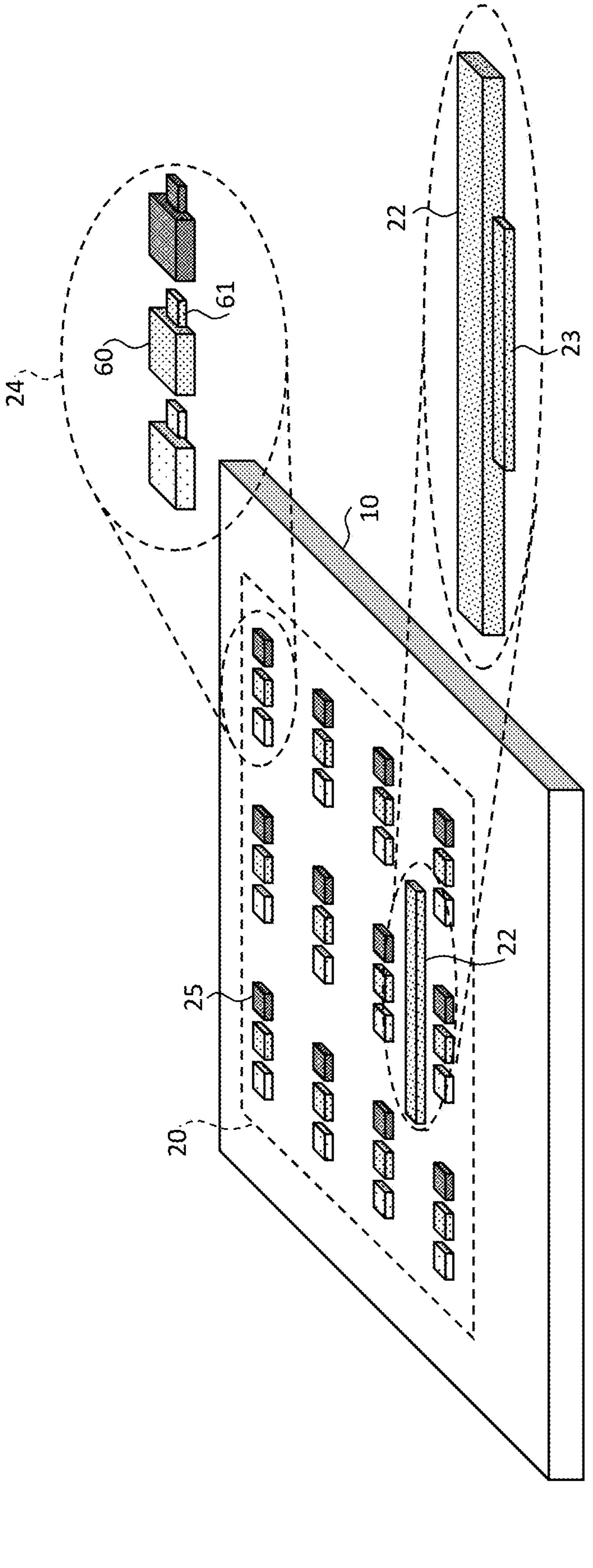
FIGS. 7A-7D are perspectives of substrates according to illustrative embodiments of the present disclosure.

Display systems 90 according to embodiments of the present disclosure can comprise light-emitting diodes (LEDs) 60 made with compound semiconductor materials and LED substrates separate, distinct, and individual from display substrate 10. As shown in FIG. 7A, each LED 60 can comprise a broken (e.g., fractured) or separated LED tether 61 broken (e.g., fractured) or separated as a consequence of micro-transfer printing LEDs 60 from an LED source wafer (e.g., a compound semiconductor substrate such as GaN or GaAs) to display substrate 10. Similarly, cluster controller 22 can comprise a broken (e.g., fractured) or separated controller tether 23 broken (e.g., fractured) or separated as a consequence of micro-transfer printing cluster controller 22 from a cluster-controller source wafer (e.g., a semiconductor substrate such as silicon) to display substrate 10. Thus, in some embodiments LEDs 60 and cluster controller 22 are disposed directly on display substrate 10 or directly on layers disposed on display substrate 10. FIG. 7A illustrates one cluster 20 disposed on display substrate 10 but display systems 90 of the present disclosure can comprise multiple clusters 20 disposed on display substrate 10, for example an array of clusters 20 defining a display area 12, such as is shown in FIG. 1.

Figure 7B:
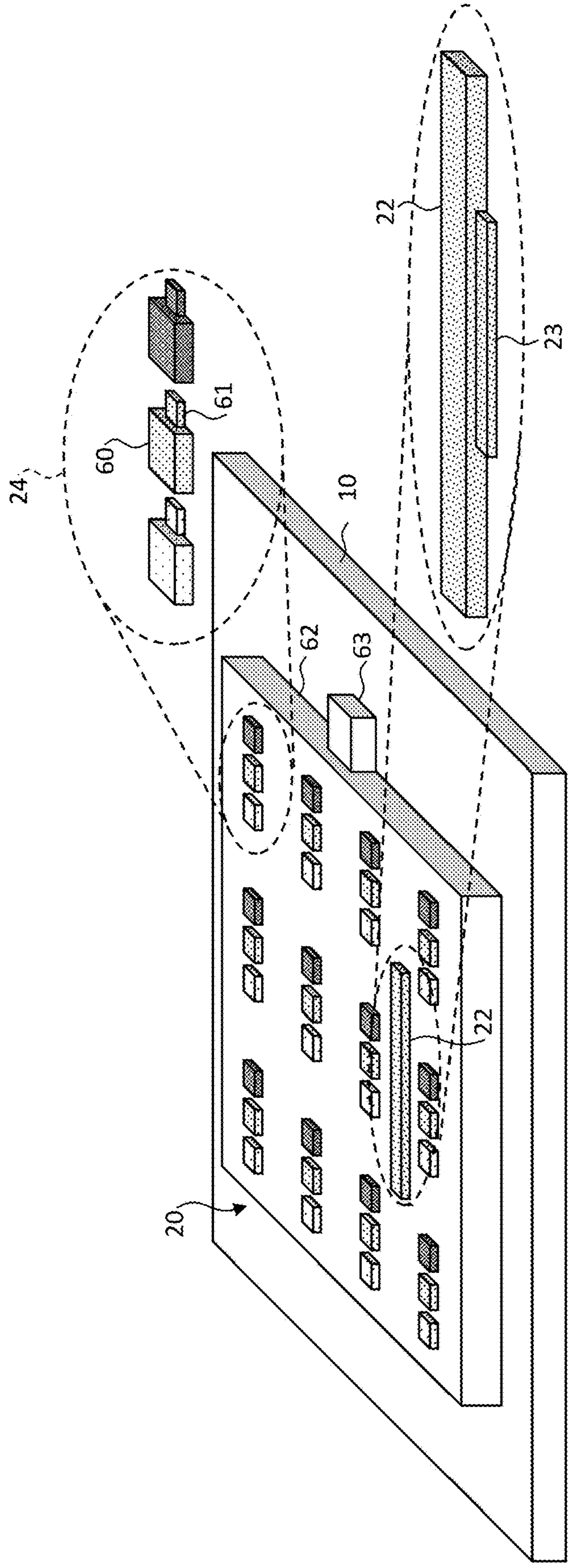

In some embodiments, and as illustrated in FIG. 7B, LEDs 60 and cluster controller 22 are micro-transfer printed onto a cluster substrate 62 that is separate, individual, and distinct from display substrate 10 and separate, individual, and distinct from LEDs 60 and any LED substrates and cluster controller 22. LEDs 60 and a cluster controller 22 of a cluster 20 can be disposed on cluster substrate 62. A single cluster 20 can be disposed on a single cluster substrate 62 or multiple clusters 20 can be disposed on a single cluster substrate 62. Cluster substrates 62 can be disposed on display substrate 10, for example by micro-transfer printing or other assembly processes, such as surface-mount technology. Clusters 20 on cluster substrates 62 can be surface-mount devices or can be micro-assembled, for example by micro-transfer printing cluster substrates 62 from a cluster source wafer to display substrate 10 so that cluster substrates 62 can comprise a broken (e.g., fractured) or separated cluster tether 63 as a consequence of micro-transfer printing. Clusters 20 on cluster substrates 62 can be packaged in order to be appropriately disposed by surface-mount technology. Cluster substrates 62 can comprise a same material as display substrate 10 or can be a different material.

Figure 7C:
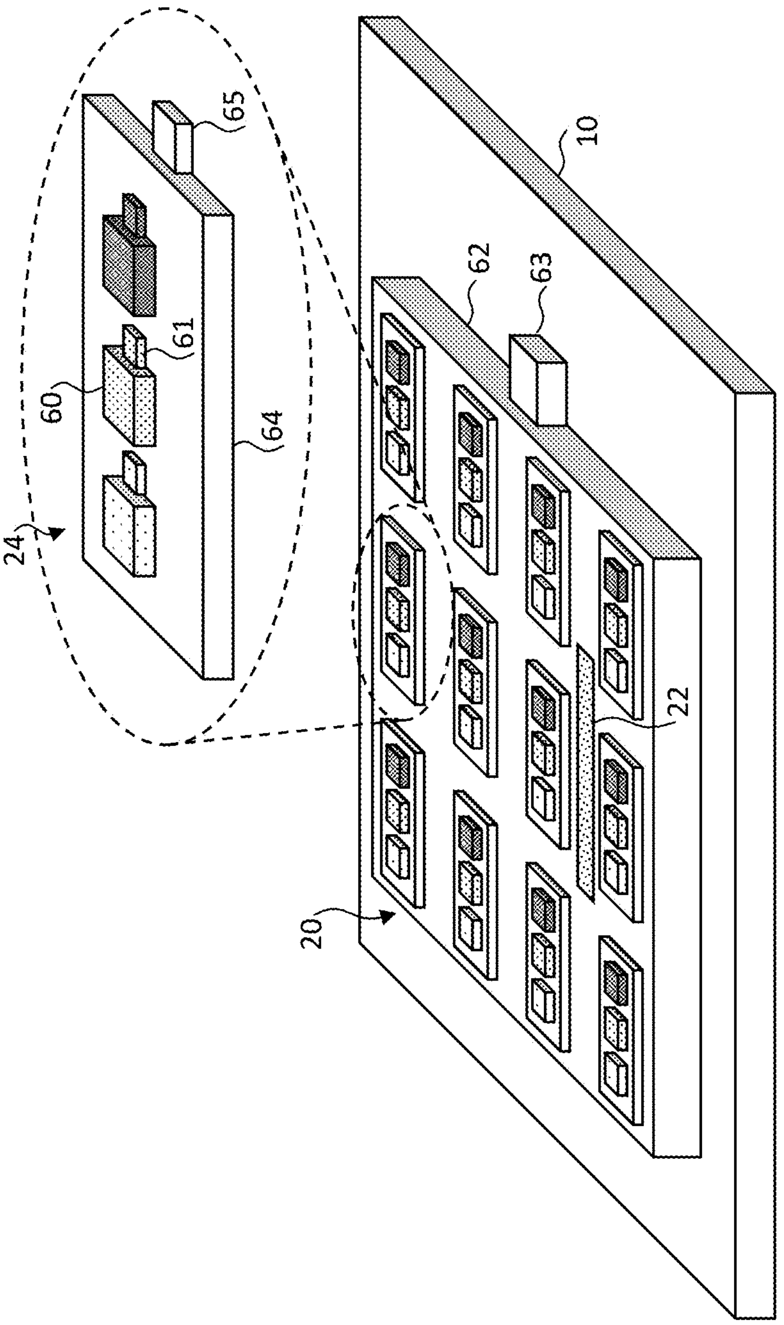

As illustrated in FIG. 7C, cluster controller 22 in each cluster 20 can be formed in or on and native to cluster substrate 62 rather than micro-assembled on cluster substrate 62, for example where cluster substrate 62 is a semiconductor substrate such as a silicon substrate and by using photolithographic processes found in the integrated circuit industry. Cluster controller 22 can be an integrated circuit. As also illustrated in FIG. 7C, pixels 24 with LEDs 60 can be micro-assembled on a pixel substrate 64 and pixel substrate 64 can be micro-assembled on cluster substrate 62 so that pixel substrate 64 can comprise a fractured or separated pixel tether 65 as a consequence of micro-assembling pixel substrate 64 from a pixel source wafer to cluster substrate 62. Pixel substrates 64 can comprise material similar to or the same as cluster substrate 62 or display substrate 10. One or more pixels 24 with pixel substrates 64 can be disposed directly on cluster controller 22, so that cluster controller 22 can occupy a substantial amount of space on cluster substrate 62 or cluster controller 22 can be disposed between pixels 24 (e.g., as shown in FIG. 7C).

Cluster substrate 62 can be assembled on display substrate 10 or layers on display substrate 10.

Figure 7D:
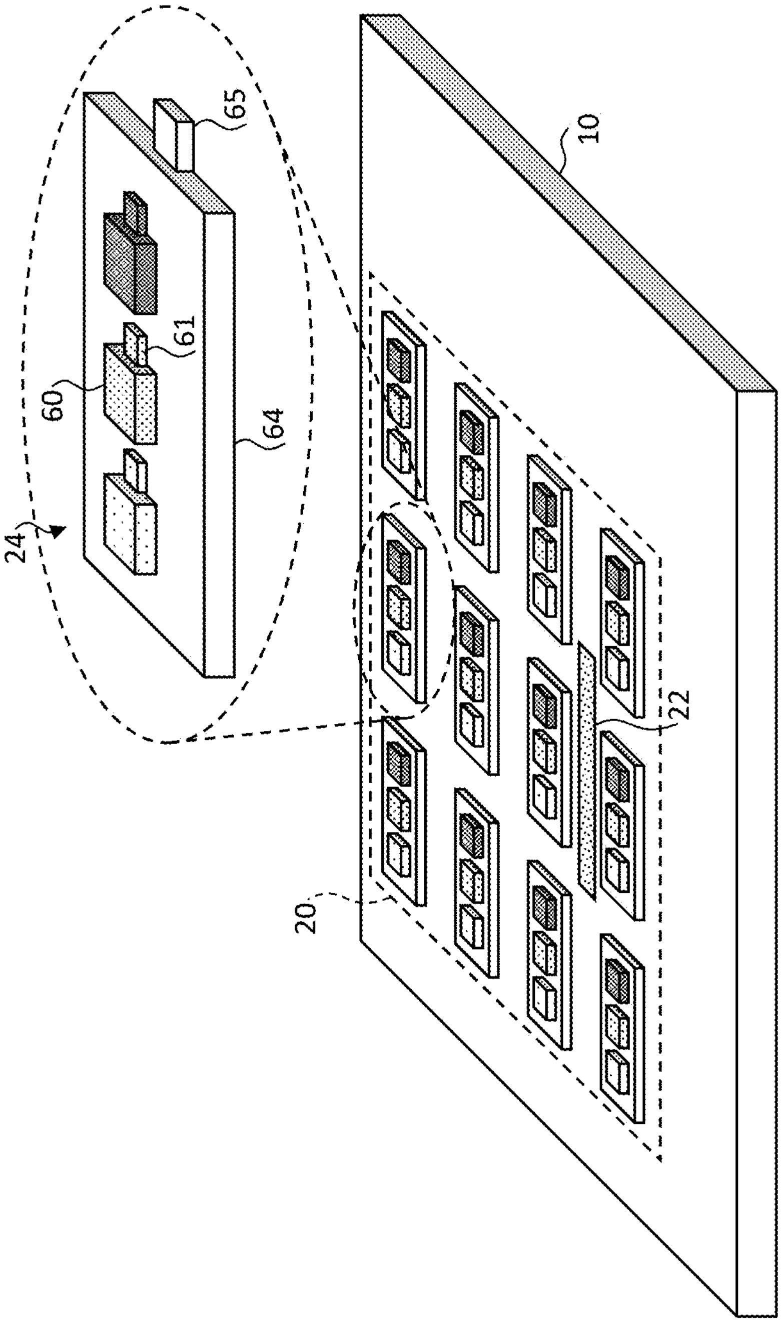

According to some embodiments and as shown in FIG. 7D, cluster controller 22 can be formed in or on and native to display substrate 10, for example where display substrate 10 is a semiconductor substrate and, e.g., with photolithographic processing and materials, for example a silicon substrate in a micro-display. LEDs 60 in pixels 24 can be assembled, for example by micro-transfer printing, directly on display substrate 10 or layers on display substrate 10, as shown in FIG. 7A, or can be disposed on pixel substrates 64 and pixel substrates 64 can be assembled, for example by micro-transfer printing, onto display substrate 10 or layers disposed on display substrate 10, as shown in FIG. 7D.

Embodiments of the present disclosure illustrate in FIGS. 7B-7D use cluster substrates 62 or pixel substrates 64, or both, to provide a compound micro-assembled structure. Such structures can be tested before assembly on display substrate 10. For example, clusters 20 on cluster substrates 62 as shown in FIGS. 7B and 7C can be tested before assembly on display substrate 10. Similarly, pixels 24 disposed on pixel substrates 64 can be tested before micro-assembly on cluster substrates 62 or display substrate 10. By testing clusters 20 or pixels 24 before assembly, any defective cluster controllers 22 or pixels 24 can be discarded and not assembled on display substrate 10 or cluster substrate 62, thereby improving display system 90 yields and reducing costs. For example, either or both cluster substrate 62 or pixel substrate 64 can comprise probe pads for automated testing and micro-assembly systems can be programmed to discard or not assemble any defective clusters 20 or defective pixels 24.

Figure 8A:
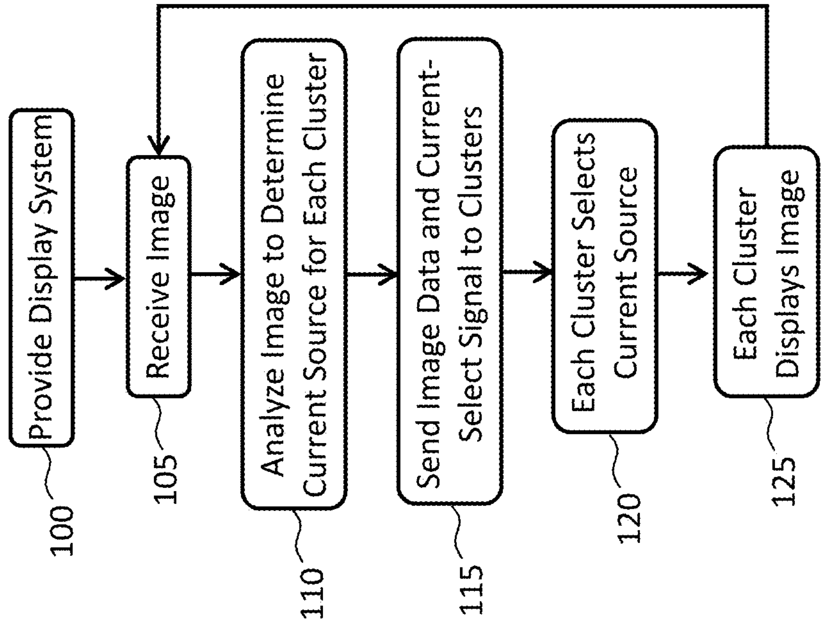
FIGS. 8A-8B are flow diagrams according to illustrative embodiments of the present disclosure.

According to embodiments of the present disclosure and as illustrated in FIG. 8A, display system 90 can operate by first providing a display system 90 in step 100. Display system 90 then receives an image, for example display controller 14 receives an image comprising image pixel values arranged in rows and columns corresponding to display pixel 24 rows and columns, in step 105. The image is then analyzed to determine the appropriate cluster current source 36 for each cluster 20, for example by display controller 14, in step 110, and the corresponding current-select signal 40 chosen for each cluster 20. The determination can be based on the current required to provide the greatest desired luminance of any display pixel 24 in each cluster 20. The image data and current-select signal 40 are then sent to each cluster 20, for example through display row and display column controllers 16, 18 and display row wires 17 and display column wires 19 to cluster controllers 22 of each cluster 20 in step 115. In response to received current-select signal 40, cluster controller 22 enables circuit 34 to enable circuit control signal 35 to select cluster current source 36. Timing signal 42 (for example provided by display row and display column controllers 16, 18 or generated internally by cluster controller 22) then controls switch 50 to display the received cluster image data with LEDs 60 in each cluster 20 in step 125. Timing signal 42 can be a pulse-width modulation, pulse density modulation, or delta sigma signal that provides a constant current to LEDs 60, thereby improving the efficiency of display system 90. Cluster controller 22 can provide passive-matrix control to LEDs 60, reducing the needed control circuits in cluster 20.

Figure 8B:
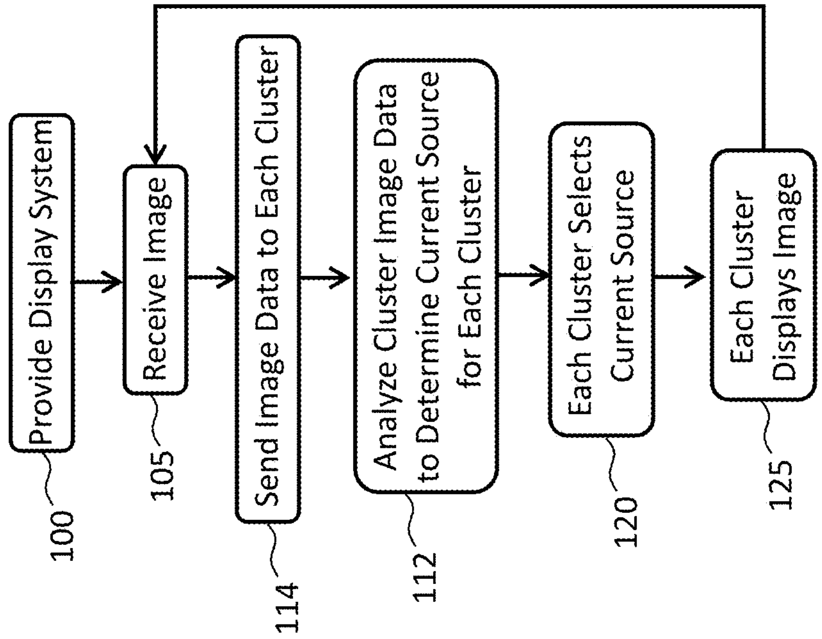

Embodiments illustrated in FIG. 8A can use a display controller 14 to analyze the image data associated with each cluster 20 and determine the appropriate cluster current source 36 for each cluster 20. According to some embodiments of the present disclosure and as illustrated in FIG. 8B, the image data analysis to determine the appropriate cluster current source 36 for a cluster 20 is performed in cluster 20. Thus, the analysis for each cluster 20 can be performed simultaneously and the communication bandwidth for cluster 20 is reduced, thereby increasing display system 90 frame rate. In some such embodiments, additional circuits must be provided in each cluster controller 22 to enable the analysis and determination, but since all that is necessary is to determine the greatest image pixel value of the cluster image data for each color or the colors together, e.g., find a greatest value, the circuitry can be simple and can be implemented directly in logic rather than requiring a stored-program machine (e.g., a computer or CPU and memory).

Therefore, according to embodiments of the present disclosure and as illustrated in FIG. 8B, display system 90 can operate by first providing a display system 90 in step 100. Display system 90 then receives an image, for example display controller 14 receives an image comprising image pixel values arranged in rows and columns corresponding to display pixels 24, in step 105. Image data for each cluster 20 is then communicated to each cluster 20, for example through display row and display column controllers 16, 18 and display row wires 17 and display column wires 19 to cluster controllers 22 of each cluster 20 in step 114. The image is then analyzed in each cluster 20 to determine the appropriate cluster current source 36 for cluster 20, for example by cluster controller 22, in step 112, and the corresponding current-select signal 40 chosen for each cluster 20. The determination can be based on the current required to provide the greatest desired luminance of any display pixel 24 in each cluster 20. In response to current-select signal 40, each cluster controller 22 enables circuit 34 to enable circuit control signal 35 to select cluster current source 36 in step 120. Timing signal 42 (for example provided by display row and display column controllers 16, 18 or generated internally by cluster controller 22) then controls switch 50 to display the received cluster image data with LEDs 60 in each cluster 20 in step 125. Timing signal 42 can be a pulse-width modulation, pulse density modulation, or delta sigma signal that provides a constant current to LEDs 60, thereby improving the efficiency of display system 90. Cluster controller 22 can provide passive-matrix control to LEDs 60, reducing the number and size needed in control circuits in cluster 20. Thus, clusters 20 can be externally controlled, e.g., by display row and display column controllers 16, 18, using active-matrix circuits, each cluster 20 can control display pixels 24 in the cluster using passive-matrix circuits.

Figure 9A:
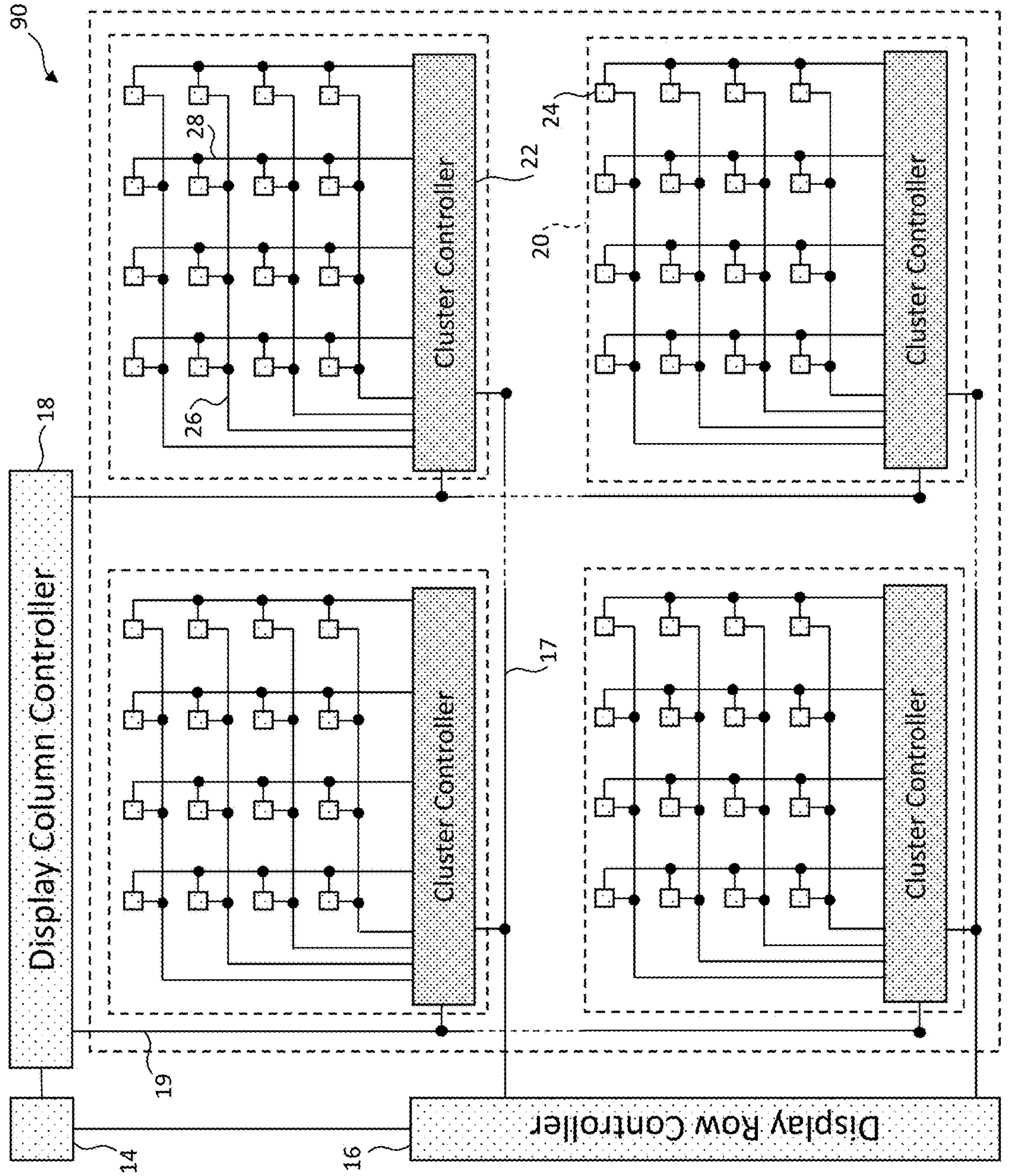
FIGS. 9A-9B are schematic plan views of a display system according to illustrative embodiments of the present disclosure.
Figure 9B:
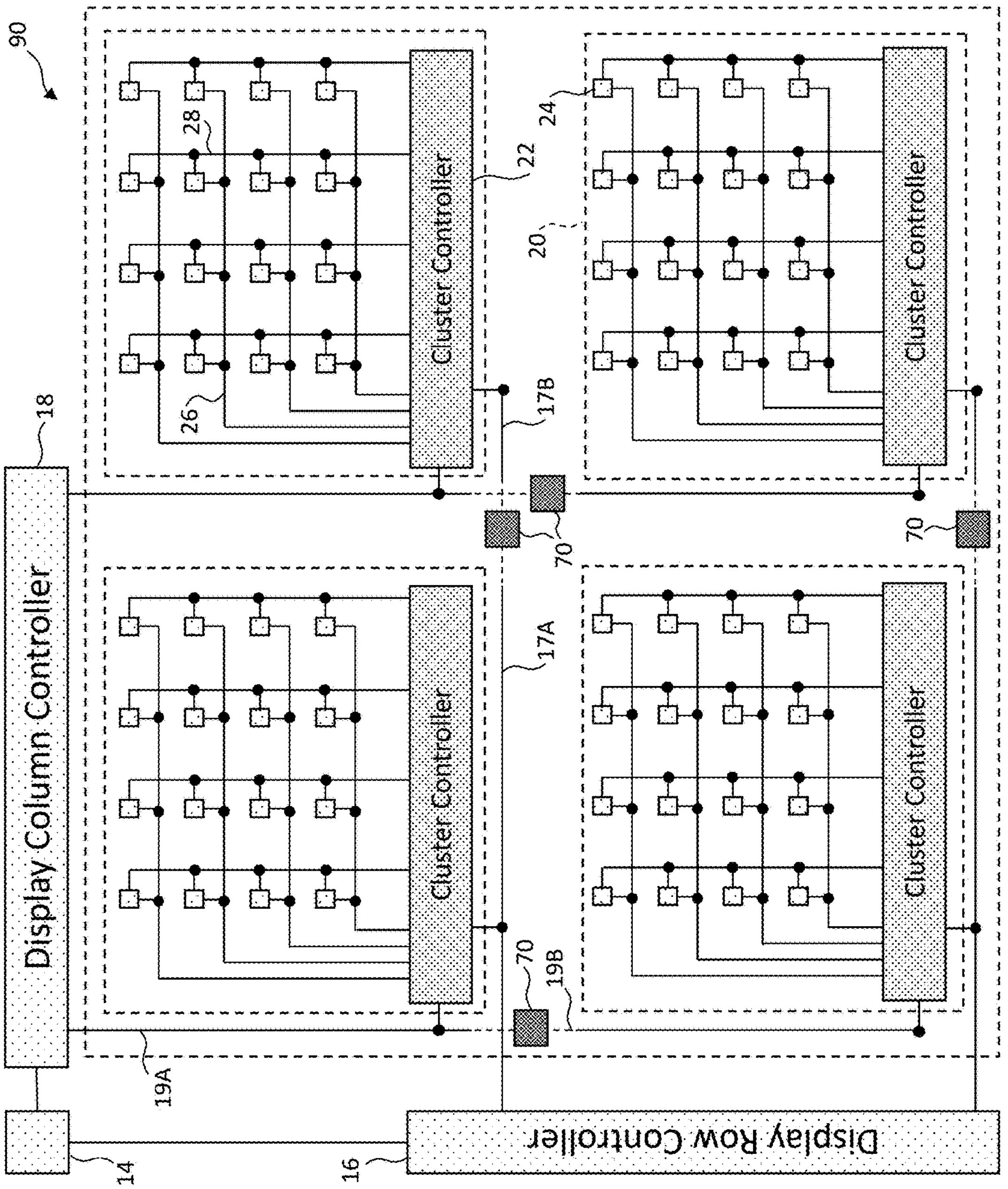

Display substrates 10 of large-format displays can have signal-carrying wires (e.g., display row wires 17 and display column wires 19) that are lengthy (e.g., greater than one meter). Such long wires have a finite resistance and can experience parasitic capacitance and therefore signals carried on the wires can degrade significantly over the extent of display substrate 10. FIG. 9A illustrates display row wires 17 and display column wires 19 directly connected to each cluster 20 and cluster controller 22 in an array of clusters 20 disposed over display substrate 10. According to some embodiments and as illustrated in FIG. 9B, display system 90 can comprise signal regeneration circuits 70 that regenerate signals (e.g., display row signals 17 and display column signals 19) In some such embodiments, display row wires 17 and display column wires 19 each comprise separate wire segments that are indirectly electrically connected through signal regeneration circuits 70. Thus, according to embodiments of the present disclosure and as shown in FIG. 9B, a display system 90 can comprise an array of display pixels 24 distributed in rows and columns. A first wire segment (e.g., first display row wire segment 17A or first display column wire segment 19A) is electrically connected to a first cluster 20 or first cluster controller 22 and a second wire segment (e.g., second display row wire segment 17B or second display column wire segment 19B) is electrically connected to a second cluster 20 or second cluster controller 22. Signal regeneration circuit 70 is operable to regenerate a signal conducted on the first wire segment and drive the regenerated signal onto the second wire segment.

Figure 10C:
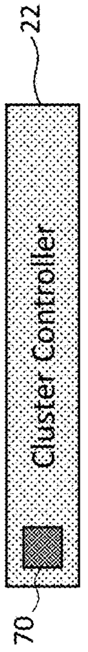
FIG. 10C is a schematic diagram of a regeneration circuit disposed in or as part of a cluster controller, according to illustrative embodiments of the present disclosure.
Figure 10A:
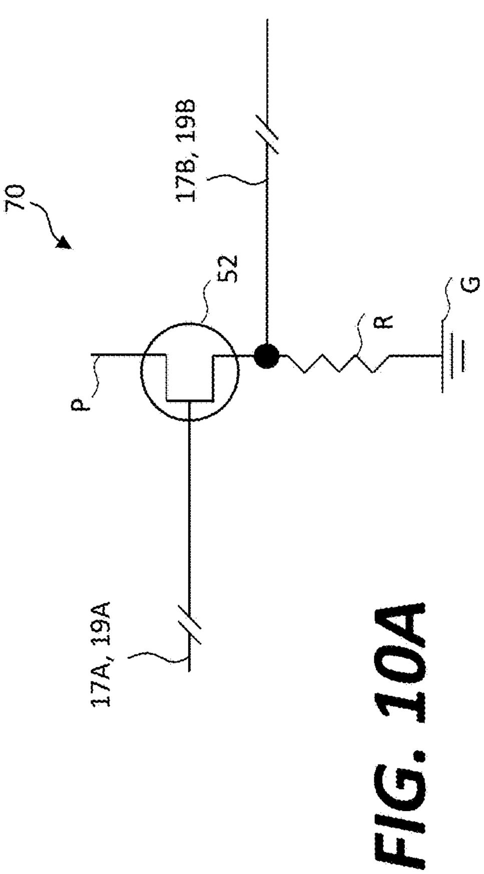
FIG. 10A is a schematic of a regeneration circuit.
Figure 10B:
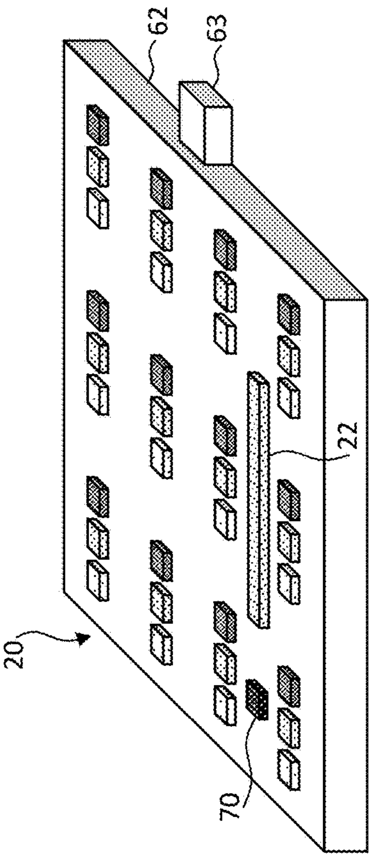
FIG. 10B is a perspective of a regeneration circuit on a cluster substrate.

FIG. 10A illustrates a simple signal regeneration circuit 70. A gate of a transistor 52 is connected to first wire segments (e.g., first display row wire segment 17A or first display column wire segment 19A), transistor 52 source is connected to power P, the transistor 52 drain is connected through a resistor R to ground G and second wire segments (e.g., second display row wire segment 17B or second display column wire segment 19B). When a signal is received on the transistor 52 gate, transistor 52 is turned on and transistor 52 drain is pulled high to regenerate the signal connected to transistor 52 gate. As will be appreciated by those knowledgeable in electronic circuit design, many other signal regeneration circuits 70 are possible and are contemplated in various embodiments of the present disclosure. One or multiple clusters 20 or cluster controllers 22 can be connected to each first and to each second wire segment and embodiments of the present disclosure can comprise more than two wire segments (e.g., more than two display row wire segments 17B or more than two display column wire segments 19B) for each wire (e.g., display row wire 17 or display column wire 19) and one or multiple clusters 20 or cluster controllers 22 can be connected to each of the more than two wire segments. Signal regeneration circuits 70 can be disposed on display substrate 10 separately from other circuits (for example signal regeneration circuits 70 can be unpackaged, bare integrated-circuit dies micro-transfer printed to display substrate 10 and can have broken (e.g., fractured) or separated tethers), as shown in FIG. 9B. In some embodiments, signal regeneration circuits 70 can be disposed on cluster substrate 62, either as a separate unpackaged, bare integrated circuit die or native to cluster substrate 62, for example as shown in FIG. 10B, or as a part of cluster controller 22, for example as shown in FIG. 10C. Signal regeneration circuits 70 can enable good signal propagation over large display substrate 10 and enable larger display systems 90 with faster frame rates and fewer display pixel errors.

Display substrate 10 can be any useful substrate on which cluster controllers 22 and an array of pixels 24 can be suitably disposed, for example glass, plastic, resin, fiberglass, semiconductor, ceramic, quartz, sapphire, or other substrates found in the display or integrated circuit industries. Display substrate 10 can be flexible or rigid and can be substantially flat. Display row wires 17 and display column wires 19 can be wires (e.g., photolithographically defined electrical conductors such as metal lines) disposed on display substrate 10 that conduct electrical current from display row controllers 16 and display column controllers 18, respectively, to cluster controllers 22. Similarly, cluster row wires 26 and cluster column wires 28 can be wires (e.g., photolithographically defined electrical conductors such as metal lines) disposed on display substrate 10 that conduct electrical current from cluster controllers 22 to pixels 24 and LEDs 60.

Generally, display substrate 10 has two opposing smooth sides suitable for material deposition, photolithographic processing, or micro-transfer printing of micro-LEDs 60 or cluster controllers 22. Display substrate 10 can have a size of a conventional display, for example a rectangle with a diagonal of a few centimeters to one or more meters. Display substrate 10 can include polymer, plastic, resin, polyimide, PEN, PET, metal, metal foil, glass, a semiconductor, or sapphire and have a transparency greater than or equal to 50%, 80%, 90%, or 95% for visible light. In some embodiments of the present disclosure, LEDs 60 emit light through display substrate 10. In some embodiments, LEDs 60 emit light in a direction opposite display substrate 10. Display substrate 10 can have a thickness from 5 microns to 20 mm (e.g., 5 to 10 microns, 10 to 50 microns, 50 to 100 microns, 100 to 200 microns, 200 to 500 microns, 500 microns to 0.5 mm, 0.5 to 1 mm, 1 mm to 5 mm, 5 mm to 10 mm, or 10 mm to 20 mm). According to some embodiments of the present disclosure, display substrate 10 can include layers formed on an underlying structure or substrate, for example a rigid or flexible glass or plastic substrate.

In some embodiments, display substrate 10 can have a single, connected, contiguous display area 12 (e.g., a convex hull including pixels 24 that each have a pixel functional area such as the light-emitting area of LEDs 60 in pixels 24). The combined functional area of light emitters 60 can be less than or equal to one-quarter of display area 12. In some embodiments, the combined functional areas of light emitters 60 is less than or equal to one eighth, one tenth, one twentieth, one fiftieth, one hundredth, one five-hundredth, one thousandth, one two-thousandth, or one ten-thousandth of the contiguous system substrate area. Thus, remaining area over display substrate 10 is available for additional functional elements such as cluster controllers 22.

Cluster controller 22 can be, for example, a bare, unpackaged integrated circuit disposed between rows and columns of pixels 24 micro-transfer printing or formed in cluster substrate 62 or display substrate 10 that provides control, timing (e.g., clocks) or data signals (e.g., column-data signals) through cluster row wires 26 and cluster control wires 28 to pixels 24 to enable pixels 24 to emit light in display system 90. Cluster controller 22 can comprise a single integrated circuit or can comprise multiple integrated circuits, e.g., electrically connected integrated circuits. The integrated circuit(s) can be micro-transfer printed as unpackaged dies and can comprise broken (e.g., fractured) or separated controller tether(s) 23.

The array of pixels 24 can be a completely regular array (e.g., as shown in FIG. 1) or can have pixel rows or pixel columns of pixels 24 that are offset from each other, so that pixel rows or pixel columns of pixels 24 are not disposed in a straight line and can, for example, form a zigzag line (not shown in the Figures) or, as another example, have non-uniform spacing(s). Cluster controllers 22 can be disposed between rows or columns of pixels 24 even when pixels 24 are arranged in a regular array, at least in part because cluster controllers 22 can be micro-integrated-circuits comprising bare, unpackaged die of a size that can be disposed between rows or columns, or both, of pixels 24 by micro-transfer printing.

Pixels 24 can be passive-matrix pixels 24, can be analog or digital (e.g., including one or more analog or digital controllers), and can comprise one or more light-controlling or light-responsive elements, e.g., inorganic micro-light-emitting diodes 60. Pixels 24 can comprise micro-light-emitting diodes 60. Inorganic light-emitting diodes 60 can have a small area, for example having a length and a width each no greater than 20 microns, no greater than 50 microns, no greater than 100 microns, or no greater than 200 microns. Such small, light emitters 60 leave additional area on display substrate 10 for more or larger wires or additional functional elements such as cluster controllers 22. When active, pixels 24 can be controlled at a constant current with timing signals 42 such as temporal pulse-width modulation signals provided by cluster controller 22. Pixels 24 can comprise a red-light-emitting diode 60 that emits red light, a green-light-emitting diode 60 that emits green light, and a blue-light-emitting diode 60 that emits blue light (collectively light-emitting diodes 60 or LEDs 60) under the control of cluster controller 22. In certain embodiments, light emitters 60 that emit light of other color(s) are included in pixel 24, such as a yellow light-emitting diode 60. Light-emitting diodes 60 can be mini-LEDs 60 (e.g., having a largest dimension no greater than 500 microns) or micro-LEDs 60 (e.g., having a largest dimension of no greater than 100 microns). Pixels 24 can emit one color of light or white light (e.g., as in a black-and-white display) or multiple colors of light (e.g., red, green, and blue light as in a color display).

According to some embodiments of the present disclosure, pixels 24 comprise inorganic micro-light-emitting diodes 60 that have a length, a width, or both over array substrate 10 or pixel substrate 64 that is no greater than 100 microns (e.g., no greater than 50 microns, no greater than 20 microns, no greater than 15 microns, no greater than 12 microns, no greater than 10 microns, no greater than 8 microns, no greater than 5 microns, or no greater than 3 microns). Such relatively small, light emitters 60 disposed on a relatively large display substrate 10 (for example a laptop display, a monitor display, or a television display) take up relatively little area on display substrate 10 so that the fill factor of LEDs 60 on display substrate 10 (e.g., the aperture ratio or the ratio of the sum of the areas of LEDs 60 over display substrate 10 to the convex hull area of display substrate 10 that includes LEDs 60 or minimum rectangular area of the array of pixels 24 such as display area 12) is no greater than 30% (e.g., no greater than 20%, no greater than 10%, no greater than 5%, no greater than 1%, no greater than 0.5%, no greater than 0.1%, no greater than 0.05%, or no greater than 0.01%). For example, an 8K display (having a display array 12 bounding 8192 by 4096 display pixels 24) over a 2-meter diagonal 9:16 display with micro-LEDs 60 having a 15-micron length and 8-micron width has a fill factor of much less than 1%. An 8K display having 40-micron by 40-micron pixels 24 can have a fill factor of about 3%. According to some embodiments of the present disclosure, the remaining area not occupied by light emitters 60 is used at least partly to dispose cluster controllers 22 between light emitters 60.

In contrast to embodiments of the present disclosure, existing prior-art flat-panel displays have a desirably large fill factor. For example, the lifetime of OLED displays is increased with a larger fill factor because such a larger fill factor reduces current density and improves organic material lifetimes. Similarly, liquid-crystal displays (LCDs) have a desirably large fill factor to reduce the necessary brightness of the backlight (because larger pixels transmit more light), improving the backlight lifetime and display power efficiency. Thus, prior displays cannot provide integrated cluster control because there is no space on their display substrates for additional or larger functional elements, such as cluster controllers 22, in contrast to embodiments of the present disclosure.

In some embodiments, integrated circuits such as LEDs 60 or cluster controllers 22 are made in or on a native semiconductor wafer and have a semiconductor substrate and are micro-transfer printed to a non-native substrate, such as pixel substrate 64, cluster substrate 62, or display substrate 10. Any of pixel substrate 64, cluster substrate 62, and display substrate 10 can include glass, resin, polymer, plastic, ceramic, or metal and can be non-elastomeric. Cluster substrate 62 can be a semiconductor substrate and cluster controller 22 can be formed in or on and native to cluster substrate 62. Semiconductor materials (for example doped or undoped silicon, GaAs, or GaN) and processes for making small integrated circuits are well known in the integrated circuit arts. Likewise, backplanes such as display substrates 10 and means for interconnecting integrated circuit elements on the backplane are well known in the display and printed circuit board arts.

In a method according to some embodiments of the present disclosure, integrated circuits are disposed on the display substrate 10 by micro transfer printing. In some methods, integrated circuits (or portions thereof) or LEDs 60 are disposed on pixel substrate 64 to form a heterogeneous pixel 24 and pixel 24 is disposed on cluster substrate 62 or display substrate 10 using compound micro-assembly structures and methods, for example as described in U.S. patent application Ser. No. 14/822,868 filed Aug. 10, 2015, entitled Compound Micro-Assembly Strategies and Devices. However, since pixels 24 or clusters 20 can be larger than the integrated circuits included therein, in some methods of the present disclosure, pixels 24 or clusters 20 are disposed on display substrate 10 using pick-and-place methods found in the printed-circuit board industry, for example using vacuum grippers. Pixels 24 or clusters 20 can be interconnected on display substrate 10 using photolithographic methods and materials or printed circuit board methods and materials.

In certain embodiments, display substrate 10 includes material, for example glass or plastic, different from a material in an integrated-circuit substrate, for example a semiconductor material such as silicon or GaN. LEDs 60 can be formed separately on separate semiconductor substrates, assembled onto cluster substrates 62 or pixel substrates 64 to form pixels 24 and then the assembled units are located on the surface of cluster substrate 62 or display substrate 10. This arrangement has an advantage that the integrated circuits, clusters 20, or pixels 24 can be separately tested on cluster substrate 62 or pixel substrate 64 and the cluster 20 or pixel 24 modules accepted, repaired, or discarded before clusters 22 or pixels 24 are located on display substrate 10, thus improving yields and reducing costs.

In some embodiments of the present disclosure, providing display system 90, display substrate 10, clusters 20, or pixels 24 can include forming conductive wires (e.g., display row wire 17, display column wire 19, cluster row wire 26, and cluster column wire 28) on display substrate 10, cluster substrate 62, or pixel substrate 64 by using photolithographic and display-substrate processing techniques, for example photolithographic processes employing metal or metal oxide deposition using evaporation or sputtering, curable resin coatings (e.g. SU8), positive or negative photoresist coating, radiation (e.g. ultraviolet radiation) exposure through a patterned mask, and etching methods to form patterned metal structures, vias, insulating layers, and electrical interconnections. Inkjet and screen-printing deposition processes and materials can be used to form patterned conductors or other electrical elements. The electrical interconnections, or wires, can be fine interconnections, for example having a width of less than fifty microns, less than twenty microns, less than ten microns, less than five microns, less than two microns, or less than one micron. Such fine interconnections are useful for interconnecting micro-integrated circuits, for example as bare dies with contact pads and used with cluster substrate 62 and pixel substrate 64. Alternatively or additionally, wires can include one or more crude lithography interconnections having a width from 2 μm to 2 mm, wherein each crude lithography interconnection electrically interconnects circuits, device, or modules on display substrate 10. For example, electrical interconnections cluster row wire 26, and cluster column wire 28 can be formed with fine interconnections (e.g., relatively small high-resolution interconnections) while display row wire 17 and display column wire 19 are formed with crude interconnections (e.g., relatively large low-resolution interconnections).

In some embodiments, red, green, and blue LEDs (e.g., micro-LEDs 50) are micro transfer printed to pixel substrates 64, cluster substrate 62, or display substrate 10 in one or more transfers and can comprise fractured or separated LED tethers 61 as a consequence of micro-transfer printing. For a discussion of micro-transfer printing techniques that can be used or adapted for use in methods disclosed herein, see U.S. Pat. Nos. 8,722,458, 7,622,367 and 8,506,867, each of which is hereby incorporated by reference in its entirety. The transferred light emitters 60 are then interconnected, for example with conductive wires and optionally including connection pads and other electrical connection structures.

In some embodiments of the present disclosure, an array of display pixels 24 (e.g., as in FIG. 1) can include at least 40,000, 62,500, 100,000, 500,000, one million, two million, three million, six million, eight million, or thirty-two million display pixels 24, for example for a quarter VGA, VGA, HD, 4K, 5K, 6K, or 8K display having various pixel densities (e.g., having at least 50, at least 75, at least 100, at least 150, at least 200, at least 300, or at least 400 pixels per inch (ppi)). In some embodiments of the present disclosure, light emitters 60 in pixels 24 can be considered integrated circuits, since they are formed in a substrate, for example a wafer substrate, or layer using integrated-circuit processes. The substrate or layer need not necessarily be silicon, for example III-V semiconductor wafers or layers can be used to form light emitters 60 using integrated-circuit processes. Light emitters 60 are considered integrated circuits (or portions thereof) in the context of this disclosure.

In some embodiments of the present disclosure, light emitters 60 are inorganic micro-light-emitting diodes 60 (micro-LEDs 60), for example having light-emissive areas of less than 10, 20, 50, or 100 square microns. In some embodiments, light emitters 60 have physical dimensions that are less than 100 μm, for example having at least one of a width from 2 to 50 μm (e.g., 2 to 5 μm, 5 to 10 μm, 10 to 20 μm, or 20 to 50 μm), a length from 2 to 50 μm (e.g., 2 to 5 μm, 5 to 10 μm, 10 to 20 μm, or 20 to 50 μm), and a height from 2 to 50 μm (e.g., 2 to 5 μm, 5 to 10 μm, 10 to 20 μm, or 20 to 50 μm). Light emitters 60 can have a size of, for example, one square micron to 500 square microns. Such micro-LEDs 60 have the advantage of a small light-emissive area compared to their brightness as well as color purity providing highly saturated display colors and a substantially Lambertian emission providing a wide viewing angle. Such small light emitters 60 also provide additional space on display substrate 10 for additional functional elements or larger wires.

In some embodiments, LEDs 60 are formed in substrates or on supports separate from display substrate 10. For example, LEDs 60 can be made in a native compound semiconductor wafer. Similarly, cluster controllers 22 can be separately formed in a semiconductor wafer such as a silicon wafer e.g., in CMOS. LEDs 60, or cluster controllers 22 are then removed from their respective source wafers and transferred, for example using micro-transfer printing, to display substrate 10, cluster substrate 62, or pixel substrate 64. Such arrangements have the advantage of using a crystalline semiconductor substrate that provides higher-performance integrated circuit components than can be made in the amorphous or polysilicon semiconductor available in thin-film circuits on a large substrate such as display substrate 10. Such micro-transferred LEDs 60 or cluster controllers 22 can comprise a broken (e.g., fractured) or separated LED tether 61 or controller tether 23 as a consequence of a micro-transfer printing process.

According to various embodiments, display system 90 can include a variety of designs having a variety of resolutions, light emitter 60 sizes, and display substrate 10 areas.

By employing a multi-step transfer or assembly process, increased yields are achieved and thus reduced costs for display systems 90 of the present disclosure. Additional details useful in understanding and performing aspects of the present disclosure are described in U.S. patent application Ser. No. 14/743,981, filed Jun. 18, 2015, entitled Micro Assembled Micro LED Displays and Lighting Elements, the disclosure of which is hereby incorporated by reference herein in its entirety.

As is understood by those skilled in the art, the terms "over", "under", "above", "below", "beneath", and "on" are relative terms and can be interchanged in reference to different orientations of the layers, elements, and substrates included in the present disclosure. For example, a first layer on a second layer, in some embodiments means a first layer directly on and in contact with a second layer. In other embodiments, a first layer on a second layer can include another layer or layers there between.

As is also understood by those skilled in the art, the terms "column" and "row", "horizontal" and "vertical", and "x" and "y", "top" and "bottom", and "left" and "right" are arbitrary designations that can be interchanged (unless otherwise clear from context).

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as operability is maintained. Moreover, two or more steps or actions in some circumstances can be conducted simultaneously. The disclosure has been described in detail with particular express reference to certain embodiments thereof, but it will be understood that variations and modifications can be effected within the spirit and scope of the following claims.

PARTS LIST

G ground
P power
C capacitor
R resistor
10 display substrate
12 display area
14 display controller
16 display row controller
17 display row signals/display row wires
17A first display row wire segment

17B second display row wire segment
18 display column controller
19 display column wire/display column signals
19A first display column wire segment
19B second display column wire segment
20 pixel cluster/cluster
22 cluster controller
22C cluster column controller
22R cluster row controller
23 controller tether
24 pixel/display pixel
26 cluster row wire/cluster row signal
28 cluster column wire/cluster column signal
30 selectable current source
32 demultiplexer
34 enable circuit
35 enable circuit control signal
35A enable circuit control signal
35B enable circuit control signal
35B enable circuit control signal
35C enable circuit control signal
36 cluster current source
38 current reference
40 current-select signal
42 timing signal
50 switch
52 transistor
52A transistor
52B transistor
52C transistor
52D transistor
60 light-emitting diode/LED/light emitter
61 LED tether
62 cluster substrate
63 cluster tether
64 pixel substrate
65 pixel tether
70 signal regeneration circuit
90 display or backlight system
100 provide display system step
105 receive image step
110 analyze image to determine current source for each cluster step
112 analyze cluster image data to determine current source for each cluster step
114 send image data to each cluster step
115 send image data and current-select signal to clusters step
120 each cluster selects current source step
125 each cluster displays image step

The invention claimed is:

1. A current-selectable light-emitting-diode (LED) display or backlight, comprising:

pixels distributed in an array of rows and columns, wherein the pixels are grouped in mutually exclusive clusters and each cluster of the mutually exclusive clusters comprises a subset of the pixels disposed in a two-dimensional array;

cluster controllers, wherein each of the cluster controllers (i) is connected to the subset of the pixels in a cluster of the mutually exclusive clusters to exclusively control the subset of the pixels in the cluster to emit light using matrix control, and (ii) comprises an independently selectable current source that is operable to commonly drive multiple pixels in the subset of the pixels in the cluster through a switch using temporal modulation with the selectable current source, wherein the selectable current source is selectable using an independent and separate current-select signal for each of the clusters and the switch is controllable using a timing signal different from the current-select signal; and a display controller, wherein the display controller is operable to analyze image data associated with each of the clusters to determine a maximum luminance of the pixels in the cluster and an appropriate current-select signal for the cluster, wherein the selectable current source comprises cluster current sources connected in parallel and any one or combination of the cluster current sources can be activated at a same time to provide a current that is a sum of current from all activated cluster current sources of the cluster current sources, wherein the current is controllable by the switch and wherein the clusters are operable such that the selectable current source of different ones of the clusters provide different currents.

2. The current-selectable LED display or backlight of claim 1, wherein the selectable current sources comprise cluster current sources that are responsive to a current-select signal to enable one or more of the cluster current sources.

3. The current-selectable LED display or backlight of claim 2, wherein at least two of the cluster current sources comprise a transistor having a different size that provides a different amount of current to a transistor of another of the cluster current sources.

4. The current-selectable LED display or backlight of claim 2, wherein each of the cluster current sources provides a same amount of current.

5. The current-selectable LED display or backlight of claim 2, wherein the cluster current sources are responsive to the current-select signal such that only one cluster current source is enabled by the current-select signal.

6. The current-selectable LED display or backlight of claim 2, wherein the cluster current sources are responsive to the current-select signal such that no cluster current source is enabled by the current-select signal.

7. The current-selectable LED display or backlight of claim 2, wherein the cluster current sources are responsive to the current-select signal such that two or more cluster current sources whose current outputs are electrically connected in common are enabled by the current-select signal.

8. The current-selectable LED display or backlight of claim 1, wherein one or more of the cluster controllers are disposed between the pixels in the array.

9. The current-selectable LED display or backlight of claim 1, wherein each of the pixels comprises a pixel substrate comprising a broken or separated pixel tether and each of the cluster controllers comprises a cluster-controller substrate comprising a broken or separated cluster-controller tether.

10. The current-selectable LED display or backlight of claim 9, comprising a display substrate and wherein the pixel substrate and the cluster-controller substrate are each disposed directly on the display substrate.

11. The current-selectable LED display or backlight of claim 9, wherein each of the clusters comprises a cluster substrate and the pixel substrates of the pixels and the cluster-controller substrate of the cluster controller in the cluster are disposed directly on the cluster substrate and the cluster substrate is disposed directly on the display substrate.

12. The current-selectable LED display or backlight of claim 1, comprising a display substrate and wherein, for each of the clusters:

each of the pixels in the cluster comprises a pixel substrate comprising a broken or separated pixel tether;
the cluster comprises a cluster substrate;
the cluster controller is native to the cluster substrate;
the pixel substrates of the pixels in the cluster are disposed directly on the cluster substrate; and
the cluster substrate is disposed directly on the display substrate.

13. The current-selectable LED display or backlight of claim 1, comprising a display substrate and wherein each of the pixels comprises a pixel substrate disposed directly on the display substrate, the cluster controllers are native to the display substrate, and the pixel substrate comprises a broken or separated pixel tether.

14. The current-selectable LED display or backlight of claim 1, wherein, for each of the clusters, each cluster controller in the cluster is operable to receive an image portion of the subset of the pixels in the cluster and a current-select signal corresponding to a luminance of the image portion, select a current of the selectable current source, and control the pixels in the cluster to emit light corresponding to the image portion.

15. The current-selectable LED display or backlight of claim 1, wherein each of the pixels comprises LEDs and the cluster controller in each of the clusters is operable to provide passive-matrix control to the LEDs in the cluster.

16. The current-selectable LED display or backlight of claim 1, wherein each of the pixels comprises one or more inorganic light-emitting diodes.

17. The current-selectable LED display or backlight of claim 1, wherein the selectable current source drives all of the pixels in the cluster.

18. The current-selectable LED display or backlight of claim 1, comprising a selectable current source for each of the rows of pixels that drives the pixels in the row of pixels or, comprising a selectable current source for each of the columns of pixels that drives the pixels in the column of pixels.

19. The current-selectable LED display or backlight of claim 1, wherein each of the pixels comprises one or more light emitters and the selectable current source drives a light emitter in each of the multiple pixels.

20. The current-selectable LED display or backlight of claim 19, wherein the one or more light emitters is two or more light emitters that each emit a different color of light and the selectable current source drives a light emitter in each of the multiple pixels that emits a same color of light.

21. A current-selectable light-emitting-diode (LED) display or backlight, comprising:
pixels distributed in an array of rows and columns, wherein the pixels are grouped in mutually exclusive clusters;
cluster controllers, each of the cluster controllers connected to each pixel in a cluster of the mutually exclusive clusters to control the pixels in the cluster to emit light, wherein each of the cluster controllers comprises an independently selectable current source that is operable to drive multiple pixels in the cluster through a switch using temporal modulation with the selectable current source, the selectable current source is selectable using an independent and separate current-select signal, and the switch is controlled using a timing signal different from the current-select signal; and
a display controller, wherein the display controller is operable to analyze image data associated with each of the clusters to determine a maximum luminance of the pixels in the cluster and an appropriate current-select signal for the cluster,
wherein the selectable current source comprises cluster current sources connected in parallel and any one or combination of the cluster current sources can be activated at a same time to provide a current that is a sum of current from all activated cluster current sources of the cluster current sources, wherein the current is controllable by the switch, and
wherein the clusters are operable such that the selectable current source of different ones of the clusters provide different currents.

22. A current-selectable LED display or backlight comprising:
pixels distributed in an array of rows and columns, wherein the pixels are grouped in mutually exclusive clusters and each cluster of the mutually exclusive clusters comprises a subset of the pixels disposed in a two-dimensional array,
cluster controllers, wherein each of the cluster controllers
(i) is connected to the subset of the pixels in a cluster of the mutually exclusive clusters to exclusively control the subset of the pixels in the cluster to emit light using matrix control, and
(ii) comprises an independently selectable current source that is operable to commonly drive multiple pixels in the subset of the pixels in the cluster through a switch using temporal modulation with the selectable current source, wherein the selectable current source is selectable using an independent and separate current-select signal for each of the clusters and the switch is controllable using a timing signal different from the current-select signal,
wherein the selectable current source comprises cluster current sources connected in parallel and any one or combination of the cluster current sources can be activated at a same time to provide a current that is a sum of current from all activated cluster current sources of the cluster current sources, wherein the current is controllable by the switch and
wherein the clusters are operable such that the selectable current source of different ones of the clusters provide different currents, and
wherein each of the clusters comprises a circuit operable to analyze image data associated with the cluster to determine a maximum luminance of the pixels in the cluster and an appropriate current-select signal for the cluster.

23. A current-selectable LED display or backlight comprising:
pixels distributed in an array of rows and columns, wherein the pixels are grouped in mutually exclusive clusters and each cluster of the mutually exclusive clusters comprises a subset of the pixels disposed in a two-dimensional array,
cluster controllers, wherein each of the cluster controllers
(i) is connected to the subset of the pixels in a cluster of the mutually exclusive clusters to exclusively control the subset of the pixels in the cluster to emit light using matrix control, and
(ii) comprises an independently selectable current source that is operable to commonly drive multiple pixels in the subset of the pixels in the cluster through a switch using temporal modulation with the selectable current source, wherein the selectable current source is selectable using an independent and separate current-select signal for each of the clusters and the switch is controllable using a timing signal different from the current-select signal, wherein the selectable current source comprises cluster current sources connected in parallel and any one or combination of the cluster current sources can be activated at a same time to provide a current that is a sum of current from all activated cluster current sources of the cluster current sources, wherein the current is controllable by the switch and wherein the clusters are operable such that the selectable current source of different ones of the clusters provide different currents, and wherein each of the clusters comprises a circuit operable to analyze image data associated with the cluster to determine a maximum luminance of the pixels in the cluster and an appropriate current-select signal for the cluster.

* * * * *